United States Patent

[11] 3,585,481

[72] Inventor Fritz Ludwig Felix Steghart
11 Moreland Drive, Gerrards Cross,
Buckinghamshire, England

[21] Appl. No 680,273
[22] Filed Sept. 1, 1967
[45] Patented June 15, 1971
Division of Ser. No. 429,949, Jan. 26, 1965, abandoned, which, in turn is a continuation-in-part of application Ser. No. 9,391, Feb. 17, 1960, now abandoned, which is a continuation-in-part of application Ser. No. 644-035, Mar. 5, 1957, now abandoned.

[54] ELECTRONIC CONTROLLER WITH P.I.D. ACTION
9 Claims, 27 Drawing Figs.

[52] U.S. Cl. .......... 318/610
[51] Int. Cl. .......... G05b 11/42
[50] Field of Search .......... 318/20.435, 20.390, 20.395

[56] References Cited
UNITED STATES PATENTS

| | | | |
|---|---|---|---|
| 2,668,264 | 2/1954 | Williams, Jr | 318/20.395 UX |
| 2,762,385 | 9/1956 | Smerke | 318/20.390 UX |
| 2,830,244 | 4/1958 | Davis | 318/390 UX |

*Primary Examiner*—T. E. Lynch
*Attorney*—Polachek & Saulsbury

ABSTRACT: An electronic controller for a physical parameter having a sensor which is responsive to the magnitude of the physical parameter and which is connected in a measuring circuit. The output of the sensor is fed to an amplifier which controls a thermal actuator which, in turn, adjusts the magnitude of the parameter. The amplifier output is also fed to a switch which produces an output fed to the amplifier input through a delay circuit. The switch output is in the sense to cause the amplifier to switch from the state it is in so that the amplifier cycles continuously and the controller acts as a time modulation circuit. Feedback is applied from the output of the actuator to the measuring circuit.

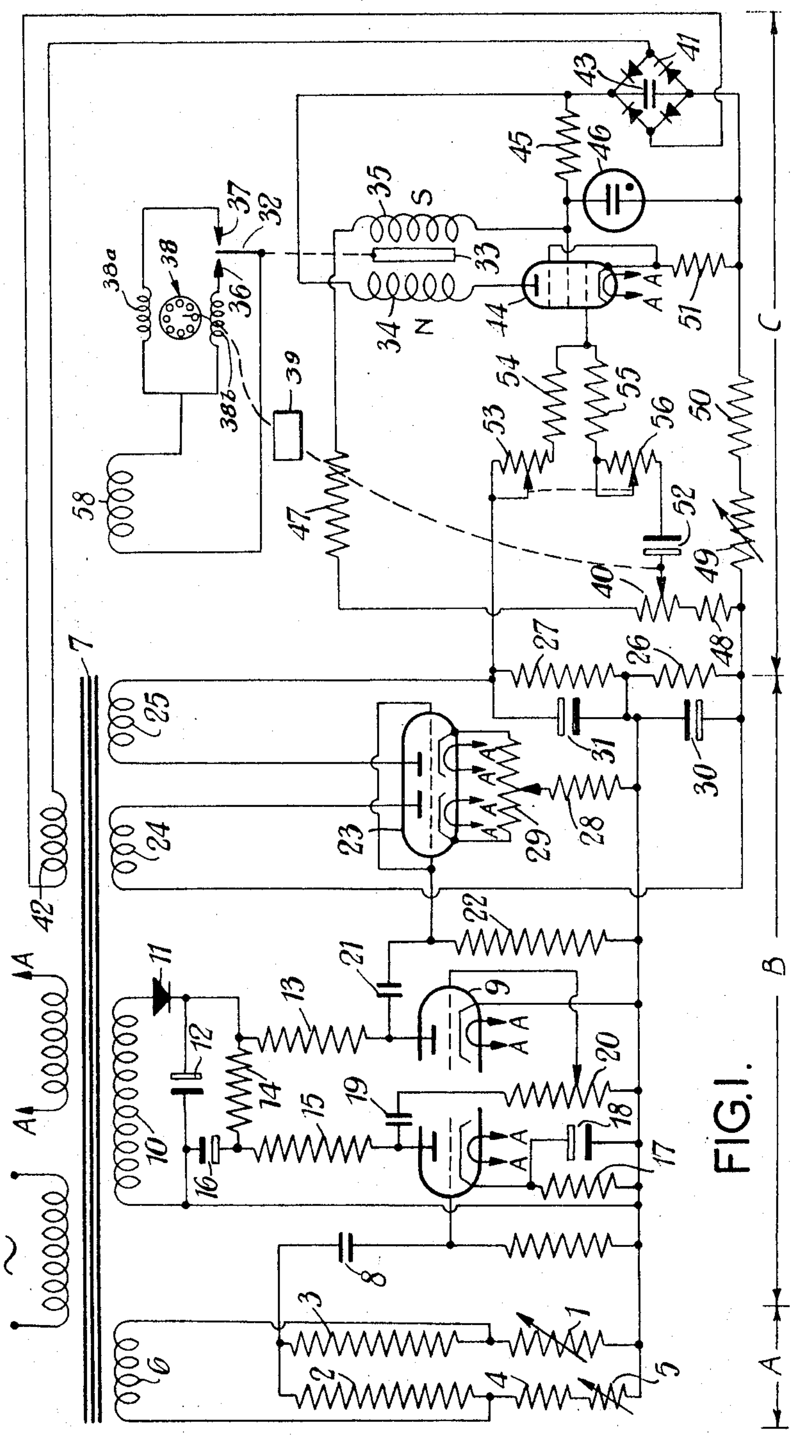
FIG. I.
INVENTOR:
FRITZ LUDWIG FELIX STEGHART
by
Richardson, David and Nordon INVENTOR
FRITZ LUDWIG FELIX STEGHART
BY
Richardson, David and Norton
Attys.

INVENTOR
FRITZ LUDWIG FELIX SIEGHART
By
Richardson, David and Nordon
Attys.

INVENTOR:
FRITZ LUDWIG FELIX STEGHART
By
Richardson, David and Nordin
Attys

INVENTOR:
FRITZ LUDWIG FELIX SIEGHART
BY
Richardson, David and Nordon
ATTYS

INVENTOR:
FRITZ LUDWIG FELIX STECHART
By
Richardson, David and Nordon
Attys

PATENTED JUN 15 1971 3,585,481

SHEET 07 OF 18

INVENTOR
FRITZ LUDWIG FELIX STEGHART
BY
Richardson, David and Nordon
Attys

INVENTOR:
FRITZ LUDWIG FELIX SIEGHART
BY
Richardson, David and Norton
Attys

INVENTOR:
FRITZ LUDWIG FELIX STEGHART
By
Richardson, David and Nordon
Att'y's.

INVENTOR
FRITZ LUDWIG FELIX STEGHART
By
E. M. Squire
ATTY

INVENTOR
FRITZ LUDWIG FELIX STIGHART
By
E. M. Squire
his ATTY

INVENTOR
FRITZ LUDWIG FELIX STEGHART
By
E. M. Squire
His Atty

INVENTOR
FRITZ LUDWIG FELIX STEGHART
by
F. M. Squire
his atty

INVENTOR
FRITZ LUDWIG FELIX STEGHART
By E. M. Squire
HIS ATTY.

INVENTOR
FRITZ LUDWIG FELIX STEGHART
By
ATTY

INVENTOR
FRITZ LUDWIG FELIX STEGHART
by
E. M. Squire

INVENTOR
FRITZ LUDWIG FELIX STEGHART
By E. M. Squire
ATTY

INVENTOR
FRITZ LUDWIG FELIX STEGHART
by E. M. Squire
ATTORNEY

ELECTRONIC CONTROLLER WITH P.I.D. ACTION

This application is a division of Ser. No. 429,949 filed Jan. 26, 1965, now abandoned, which, in turn, is a continuation-in-part of my copending application Ser. No. 9,391 filed Feb. 17, 1960, now abandoned which, in turn is a continuation-in-part of my earlier application Ser. No. 644,035 filed Mar. 5, 1957, now abandoned.

This invention concerns improvements in or relating to electronic integrators and controllers. The controllers of this invention are primarily designed for the automatic control of such physical variables as temperature, pressure, rate of fluid flow and the like.

In recent design, an integrator is used in which the voltage across the condenser of an integrating resistance-condenser circuit is taken to amplifying means and a part of the output of such amplifying means is fed back through a high insulation feedback connection to the resistance-condenser circuit to give a compensating voltage balancing the back voltage of the condenser. Whilst this design avoids some of the difficulties of previous designs further difficulties are inherent in providing the high insulation feedback connection.

It is, therefore, a primary object of the present invention to provide a new or improved controller and it therefore follows that it is a further object of the improved integrating circuit.

It is, therefore, a further object of the present invention to provide an electronic controller for a physical quantity, comprising means for developing an electrical error signal dependent in sign and magnitude on the difference between the actual and desired values of the physical quantity, an amplifier, at least one direct current amplifying stage in said amplifier, a regulating unit for said physical quantity operated by said amplifier, and at least one resistance capacity integral action element supplied by a feedback voltage controlled by the regulating unit and in turn controlling said one direct current amplifying stage of the amplifier.

Under normal circumstances it is extremely desirable to make use of combined proportional, integral and derivative controllers which are also known as "three term" or "P.I.D." controllers. A general differential equation may be derived for the action of these controllers as follows:

$$y(t)+r_o x_w(t)+r_{11w}(t)\cdot dt+r_1 x'_w(t)$$

where $y(t)$ is the time function of the complete output signal used for correction;

$r_o$ a weighting coefficient for the instantaneously proportional component of the output signal;

$x_w(t)$ is the time function or instantaneous value of the error signal or deviation of the controlled quantity from a predetermined fixed value;

$r_{11}$ is a weighting coefficient for the integrated component of the output signal;

$r_1$ is a weighting coefficient for the differentiated component of the output signal; and, $x'_w$ is the first derivative of $x_w$ with respect to time or $dx_w/dt$.

Under normal circumstances, using a controller of the general type to which this invention relates, a transducer is necessary in order to transform the physical variable into an electrical quantity and the choice of the transducer will clearly depend upon the precise physical variable that is to be controlled. The electrical value is then compared with a further electrical value which corresponds to the desired value of the physical variable to provide the error signal. However, it should be made clear that it is not necessary to derive an electrical value by means of a transducer before comparison with the desired value and it should, therefore, be emphasized that the physical variable may be compared directly with the desired value in order to get the error signal which may then be transformed into an electrical error signal.

An important feature of the controller of this invention is that the condenser in the resistance-capacity integrating circuit is unidirectionally charged so that on failure of the supply (when the condenser will discharge through the resistance or some other part of the circuit), the loss in charge of the condenser will cause the apparent error formed when the supply is restored to be in a known direction whereby the regulating unit will operate also in a known direction. This is very important for, if the condenser may have charges of either sign impressed upon its plates, on discharge due to failure of the supply the apparent error introduced cannot be forecast and, therefore, the resultant movement of the regulating unit may be in either direction. This unidirectional charging of the condenser has the further advantage that electrolytic condensers may be used for this portion of the circuit and as is known such condensers are comparably much cheaper than the nonelectrolytic types. It should be understood that the term "unidirectionally' as applied to the charging of the condenser must be read as including an asymmetrical charge.

The feedback is usually effected in one of the last amplifying stages because it makes it possible to use comparatively large voltages, and this permits an economical layout of the controller. The use of comparatively large voltages is necessary to keep zero and amplification errors as small as possible. Existing controllers use voltages of about 1 volt for the feedback, whereas the described controller works with voltages above 3 volts, and feedback voltages of 24 volts are particularly economical and permit the use of low insulation cables in the motor control circuit.

In the embodiments of this invention which are specifically described, it will be understood that a certain level of output corresponds to zero movement of the correcting element whilst outputs above and below such level correspond to movement of the correcting element in one or other direction. One practice in the embodiments described is to make use of voltage sensitive relays to control an electric motor, but in some circumstances such an arrangement is not altogether convenient, for the electric motor must also drive a feedback potentiometer which is, therefore, physically adjacent to the motor and, therefore, long feedback means may be required.

A further object of the invention, therefore, is to provide for means whereby the output of the controller modifies the air pressure in an air pressure system and this modified air pressure is used to operate directly a valve of the correcting unit and also to operate feedback means.

In order that this invention may more readily be understood, certain embodiments of the same will now be described with reference to the accompanying drawings, in which:

FIG. 1 is a circuit diagram showing a proportional and integral controller;

Figure 11:
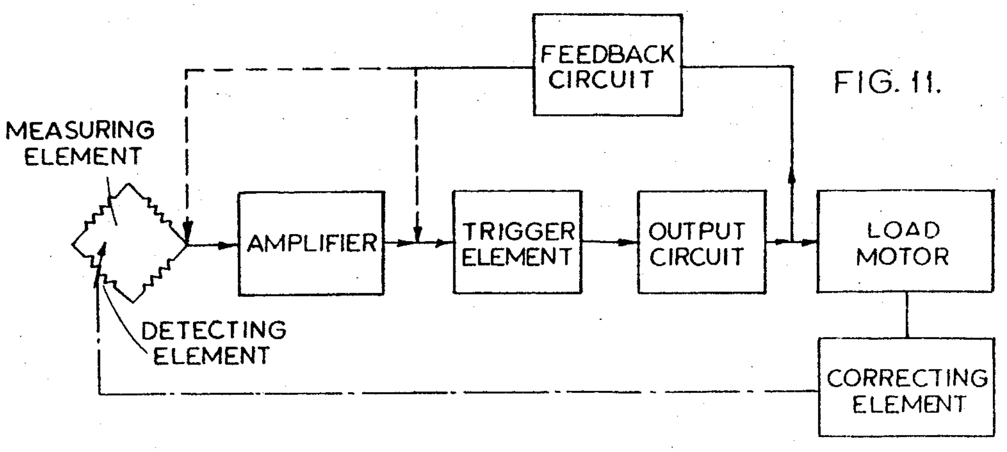
FIG. 11 is a theoretical circuit diagram of the controllers of FIGS. 7 and 9.
Figure 16:
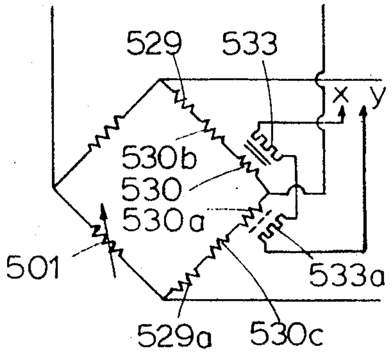
Figure 17:
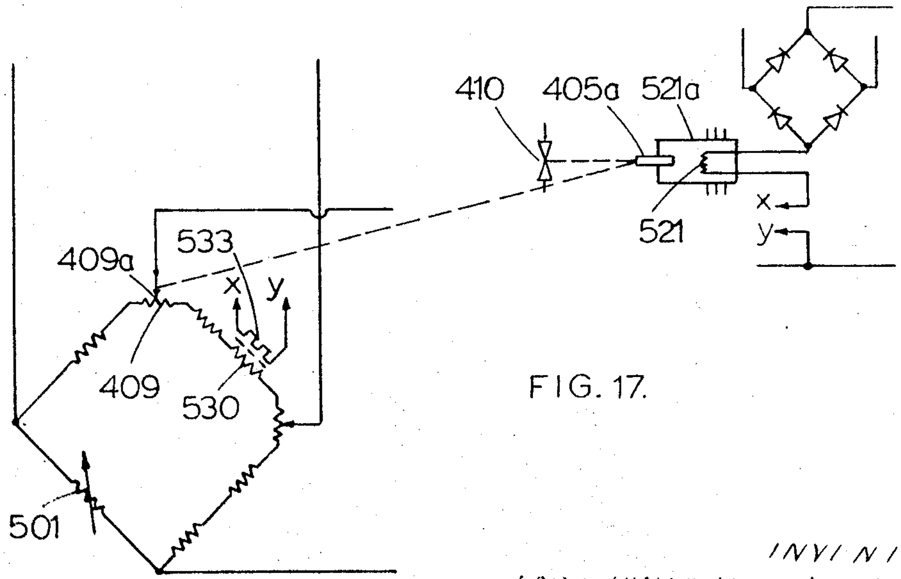
Figures 12, 12A:
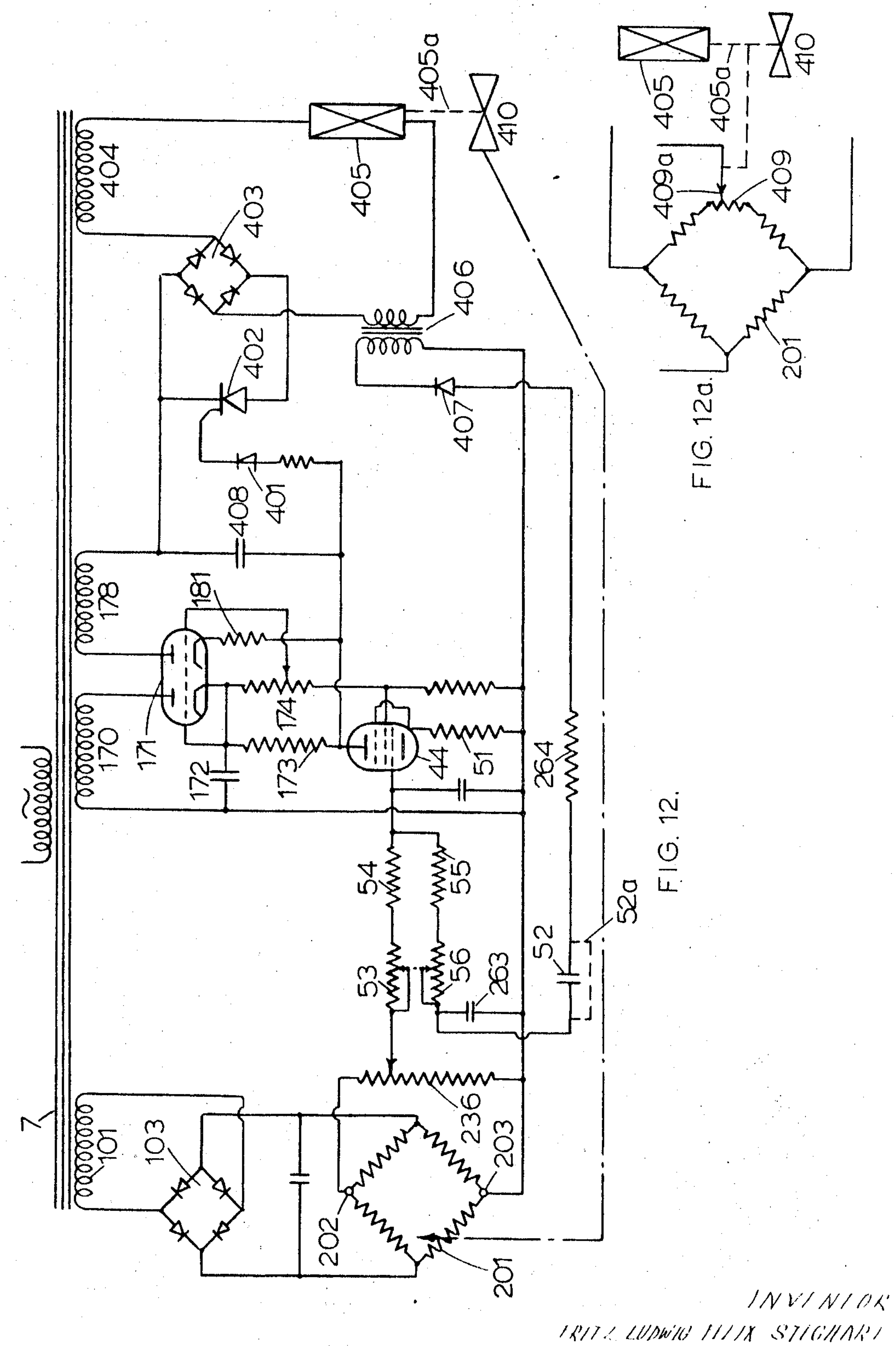
FIG. 12 is a practical embodiment of the theoretical circuit of FIG. 11.
Figure 13:
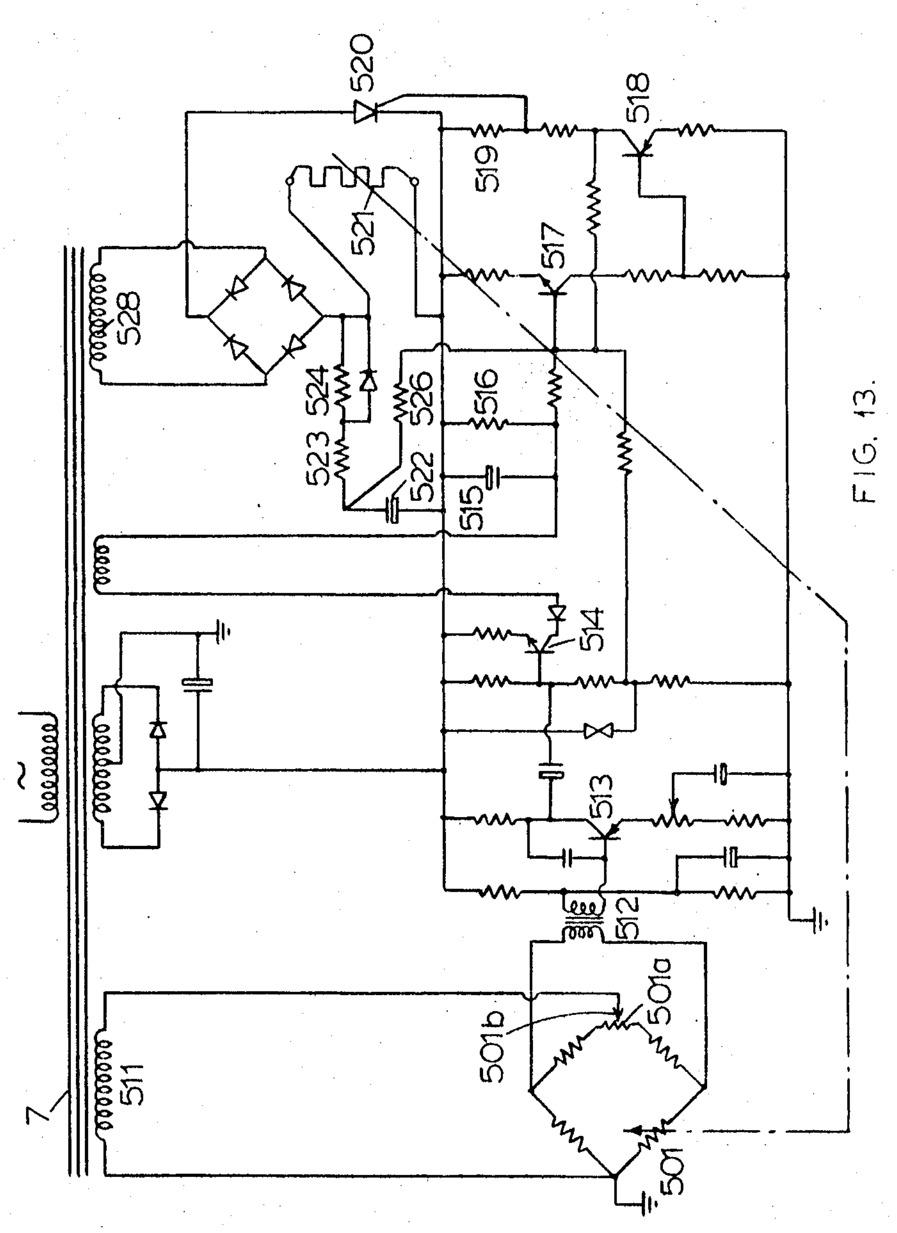
Figures 14, 15:
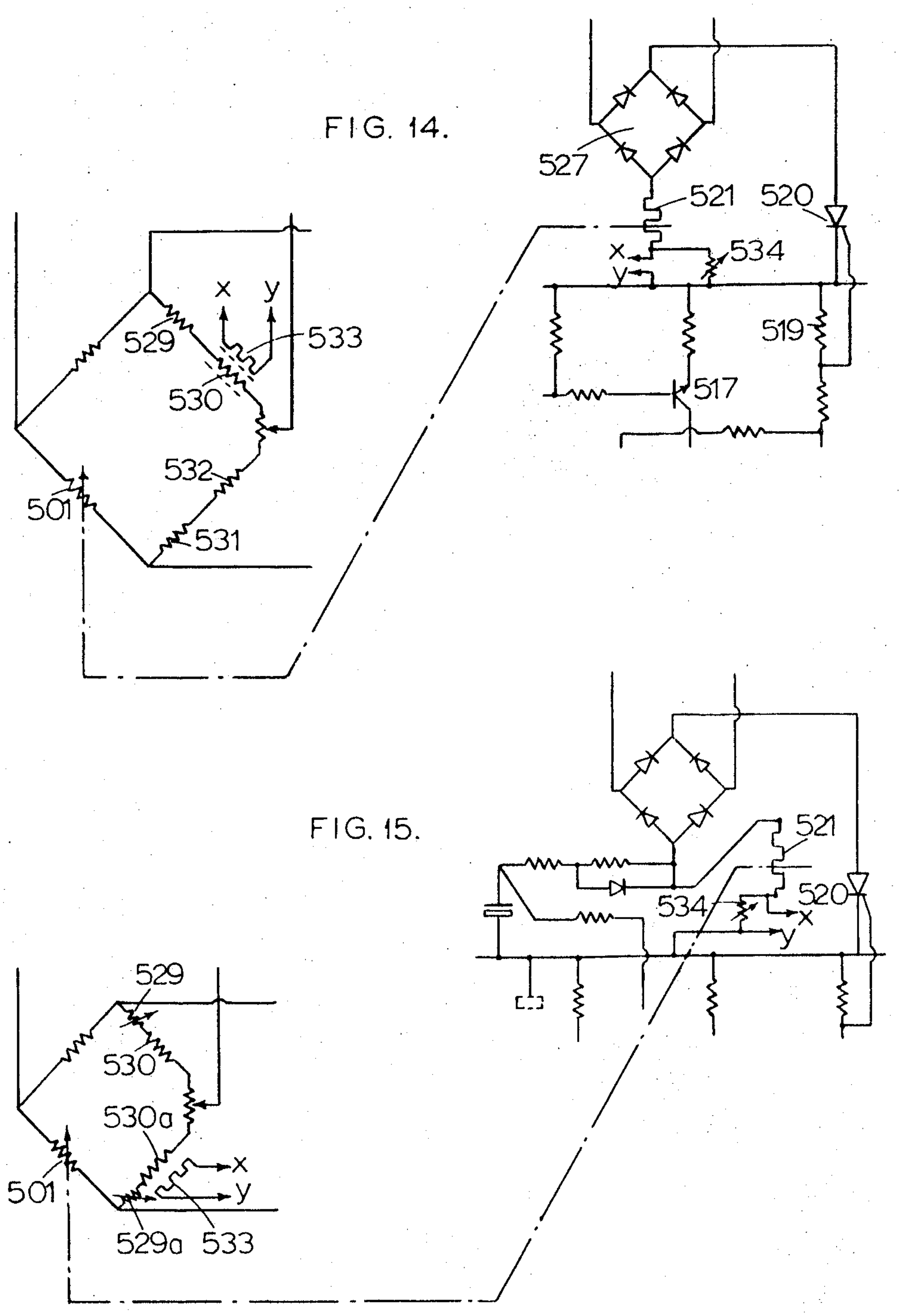
Figure 18:
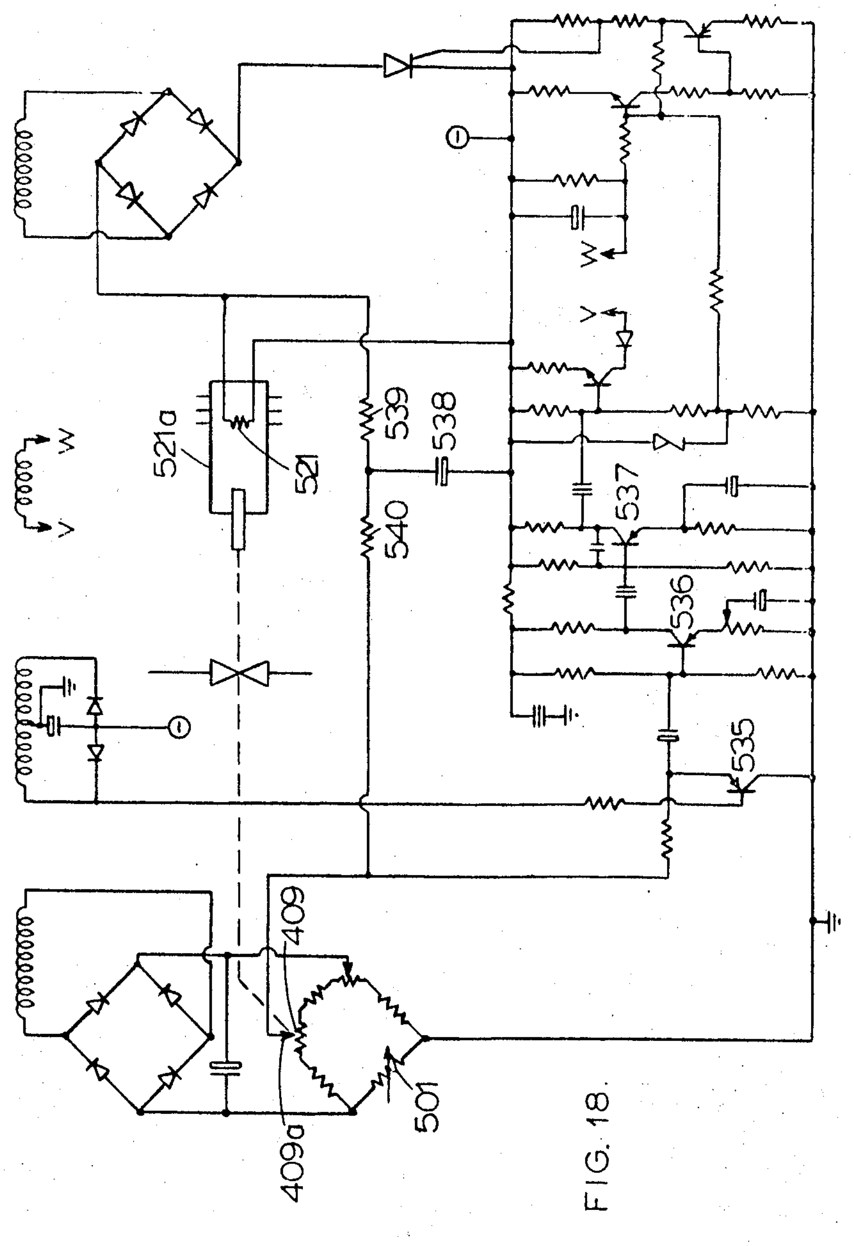
Figure 19:
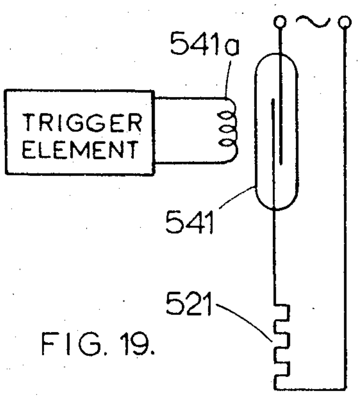
Figure 21:
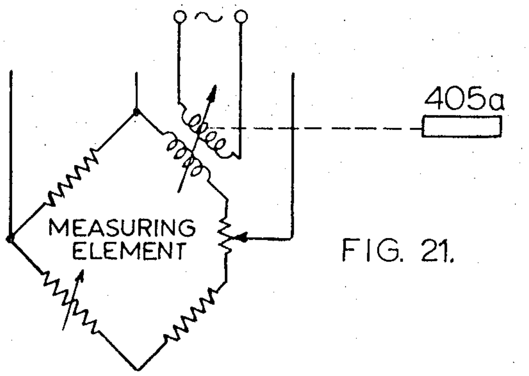
Figure 20:
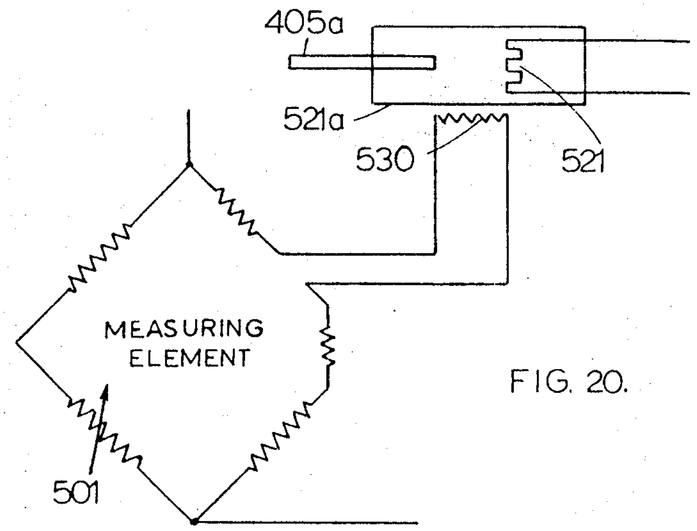

FIG. **12*a* is a modification of a part of the circuit of FIG. 12**;

FIG. 13 is a further embodiment of the theoretical circuit of FIG. 11;

FIG. 14 shows a modification of part of the circuit of FIG. 13;

FIG. 15 shows a different modification of part of the circuit of FIG. 13;

FIG. 16 shows a modification of part of the circuit of FIG. 15;

FIG. 17 shows a combination of the modifications shown in FIGS. 12a and 14;

FIG. 18 is the circuit diagram of a further embodiment of the theoretical circuit of FIG. 11;

FIG. 19 shows a modification of part of FIGS. 12, 13, 14 or 15;

FIG. 20 shows a modification of FIG. 12a or part of FIGS. 17 or 18;

FIG. 21 shows a modification of FIG. 12a or part of FIGS. 17 or 18.

Figure 22:
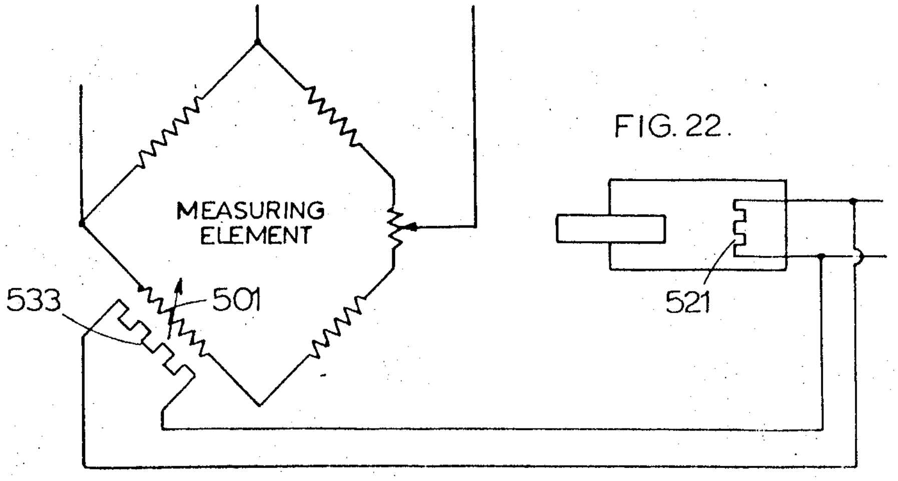
Figure 23:
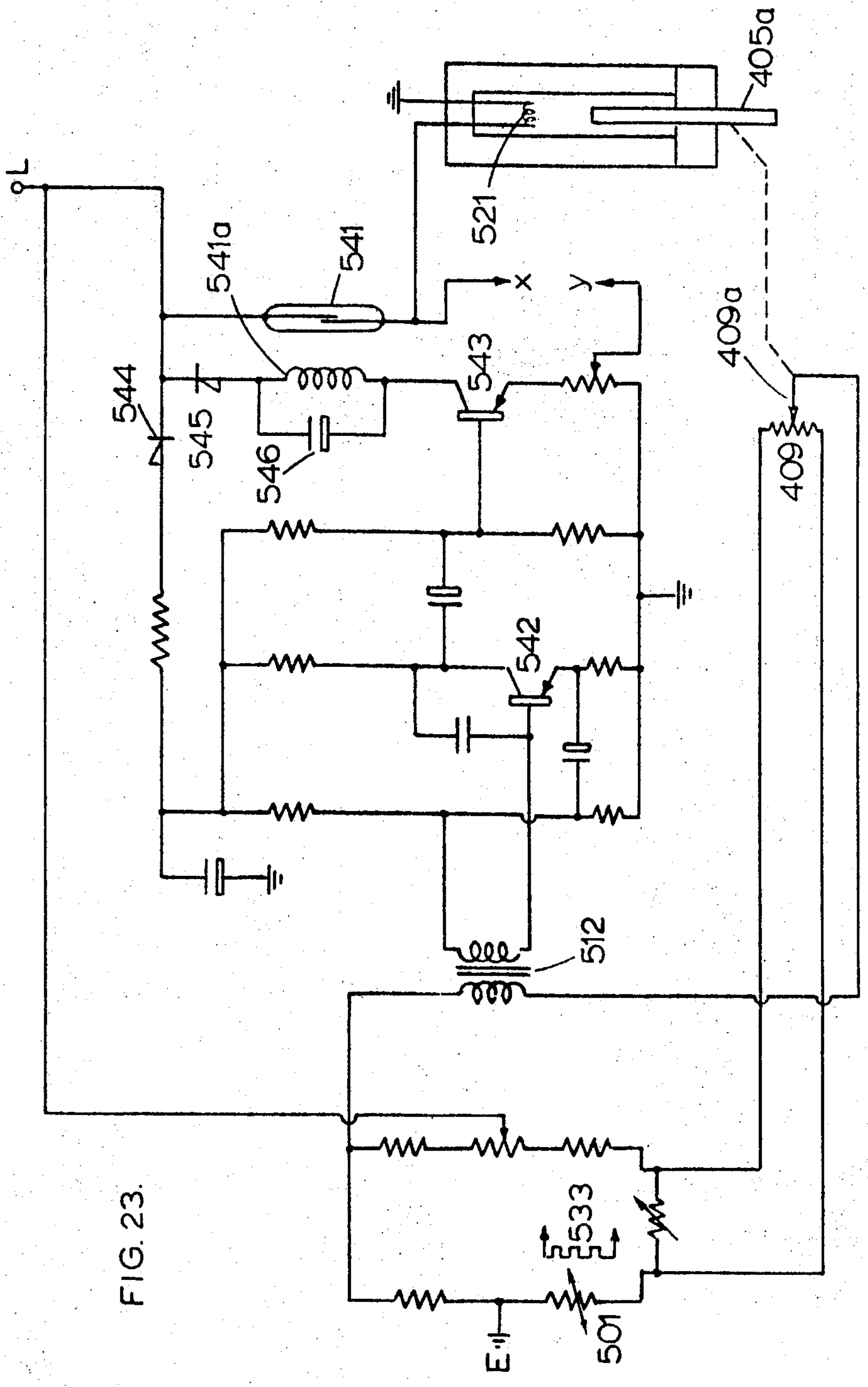
Figure 24:
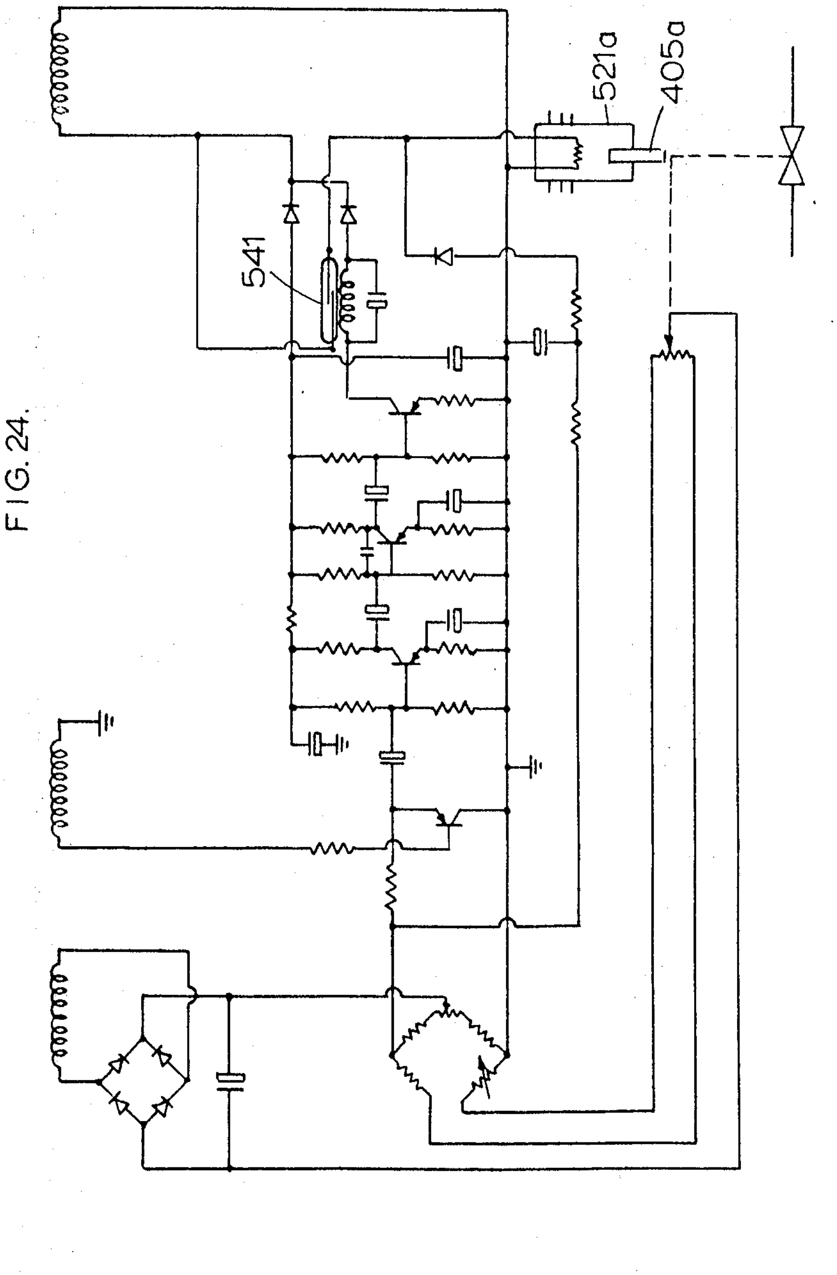
Figure 25:
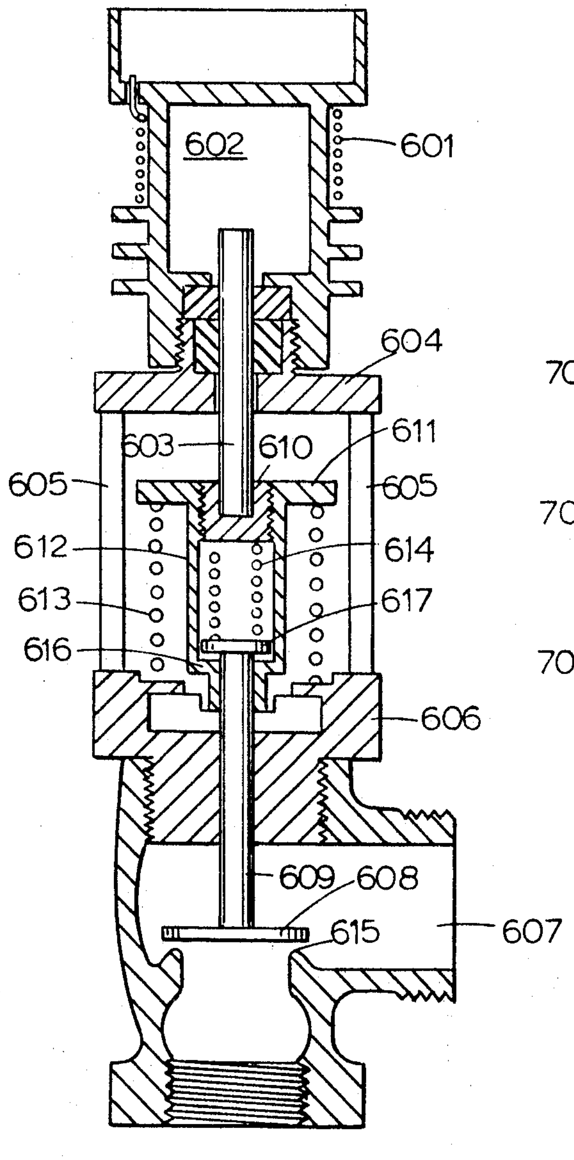
Figure 26:
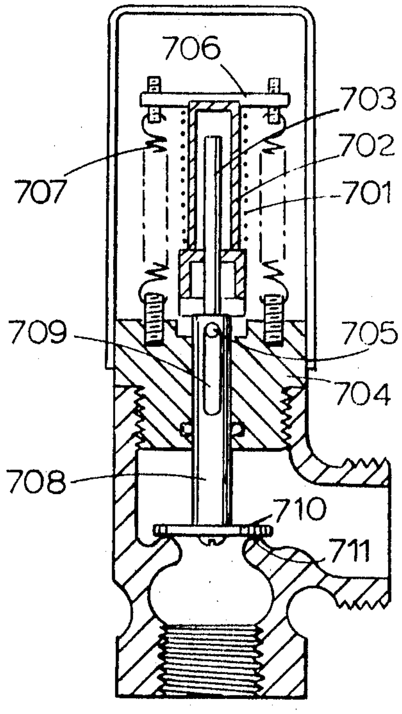

FIG. 22 shows a modification of part of FIGS. 14, 15 or 17;

FIG. 23 is a circuit diagram of a further embodiment of the theoretical circuit of FIG. 11;

FIG. 24 shows a modification of FIG. 18; and,

FIGS. 25 and 26 are sectional views of two preferred forms of assembly of a thermal motor and a valve.

Since the majority of the embodiments are based upon that illustrated in FIG. 1 but with certain modifications, where possibly the same reference numerals are used throughout the drawings in order to indicate the same parts.

In the majority of the Figures, the full circuit of the controller is divided into sections in which the various functions are as follows:

Section "A" is a detector or transducer and normally comprises a bridge circuit.

Section "D" is an amplifier and phase discriminator.

Section "C" is the integrating portion of the circuit and the control circuit for the regulating unit.

FIG. 1 will now be described in detail:

SECTION "A"

Resistance 1 is a nickel resistance thermometer used for detecting the temperature which is to be controlled. This is built into a bridge network consisting of resistances 2, 3, 4 and 5. The resistances 2 and 3 act as ratio arms and will in most instances both be of the same value. The resistance 4 and the resistance 5 (which is variable) together make up the arm of the bridge adjacent to the resistance thermometer 1, and the variable resistance 5 provides the adjustment for the desired value setting. This setting is used so that the bridge is balanced when this desired value represented by the arm 4, 5 has the same resistance as the detecting resistance thermometer 1.

The bridge network is energized with an alternating voltage from a winding 6 on a mains transformer 7. The voltage due to any out-of-balance of the bridge is applied through a condenser 8 to the grid of one half of a double triode thermionic valve 9.

SECTION "B"

The anode current for both halves of the valve 9 is derived from a winding 10 on the mains transformer 7, is rectified by a half-wave rectifier II and smoothed by an electrolytic condenser 12. This anode voltage is applied to the second anode of the valve 9 via a dropping resistance 13 and to the first anode via resistances 14 and 15 and a decoupling electrolytic condenser 16. The standing direct current from the first half of the valve 9 produces a grid bias voltage for the valve across a cathode resistance 17 which is shunted by an electrolytic condenser 18 to bypass the AC signal so as not to give negative feedback.

The AC signal which is applied to the grid of the first half of the valve 9 via the condenser 8 is amplified and fed to the grid of the second half of this valve through a condenser 19 and a potentiometer 20. This potentiometer 20 is used to control the amplification by attenuating the signal to the second grid and is used as the proportional band adjustment of the controller. From the second half of the valve 9 the AC signal is fed through a condenser 21 and a resistance 22 to both the grids of a double triode valve 23. This valve is used as a phase discriminator, the two anodes being supplied directly with alternating voltages 180° out of phase from windings 24 and 25 on the mains transformer 7. These windings 24, 25 are connected via two resistances 26 and 27 respectively and then a resistance 28 and a potentiometer 29 to the two cathodes of the valve 23. With no AC signal on the grids of this valve, the potentiometer 29 is adjusted so that both the triodes have similar anode currents and therefore no standing voltage appears across the outer ends of the resistances 26 and 27, as the voltages across these two resistances are equal and opposite; the voltages are smoothed by two electrolytic condensers 30 and 31 respectively.

When an AC signal is applied via the condenser 21 to the grids of this double triode 23 due to a deviation in temperature, it will be in phase with the applied anode voltage of one half of the valve and 180° out of phase with the anode voltage of the other half. The current will increase through the half of the valve where the grid voltage is in phase, for example it may be assumed to be the first half of this valve. This increased current will flow through the resistance 26 returning to the cathode of the valve through the resistance 29 and the left-hand side of the potentiometer 29. The voltage drop caused by this current through the resistance 28 will increase the negative bias on the right-hand half of this valve and cause the current through this half valve and the resistance 27 to drop in value. This double triode valve 23 therefore acts as a "long tailed pair" due to the common cathode resistance 28. Due to the increase in current through the resistance 26 and decrease in current through the resistance 27 a DC voltage is produced across the outer ends of these two resistances in such a sense that the lower end of resistance 26 is positive and the upper end of resistance 27 is negative. Should the applied AC voltage through the condenser 21 have been in the other phase, i.e., in phase with the anode voltage through the transformer winding 23 and out of phase with that through the transformer winding 24, the current through the resistance 27 would increase and through the resistance 26 would decrease, whilst the polarity of the voltage across the ends of these two resistances would be reversed.

The phase of the voltage applied to the grids of the valve 23 depends on whether the resistance 1 is greater or less than the sum of the resistances 4 and 5. By the appropriate connection of the winding 6 to the bridge network, the voltage may be produced across the resistances 26 and 27 so that the upper end is positive when the controlled temperature is high, i.e., the value of the resistance 1 is greater than the sum of resistances 4 and 5. When the upper end of the resistances 26 and 27 is negative, the controlled temperature will be below the desired value, i.e., the value of resistance 1 is below that of the sum of resistances of resistors 4 and 5. This signal produced across the resistances 26 and 27 is proportional to the deviation of the temperature from the desired value for any given setting of the adjustable potentiometer 20. When there is no deviation the algebraic sum of the voltages across resistors 26 and 27 is zero.

SECTION "C"

Section "C" receives the proportional signal from Section "B." Before considering the effect of this proportional signal, it is necessary to consider the way in which the regulating unit position is fed back and influences the operation. A polarized relay 33 has a nominal current of 5*m*A through each of the two windings 34 and 35 and when these two currents are equal the moving contact 32 is in the center position between stationary contacts 36 and 37. Should the current through the coil 34 increase, the center contact 32 will engage contact 36, whereas if it should decrease, the center contact 32 will engage contact 37. These two contacts 36 and 37 energize the two stator windings 38*a*, 38*b* of a reversible split phase induction motor 38 through a secondary winding 58 on the power supply transformer 7 so that it will rotate either clockwise or counterclockwise. This motor 38 is connected through a large reduction gear 39 to the regulating unit (not shown), which, for instance, could control the steam fed to a heat exchanger in an air duct leading to the space to be heated.

Besides driving the regulating unit, the large reduction gear 39 also drives the movable contact of a potentiometer 40. A bridge rectifier 41 is energized from secondary winding 42 on the power supply transformer 7 and its resulting DC voltage is smoothed by a condenser 43. This direct voltage supplies the anode of a pentode valve 44 through the winding 34 of the polarized relay 33. The rectifier also supplies current through a dropping resistance 45 to a voltage stabilizer 46 which has the well-known characteristic of automatically keeping the potential across itself constant by varying the current it draws, so varying the voltage drop across the resistance 45. This constant voltage is applied to the screen grid of the pentode valve 44. The stabilizer 46 also gives a constant current through the winding 35 of the polarized relay 33, a dropping resistance 47, the feedback potentiometer 40, a dropping resistance 48, and grid bias resistances 49 and 50. Although this current is described as constant, it is actually the voltage which is stabilized and the current will vary due to small changes in the resistances of the copper windings of the coil 35 of the polarized relay 33, due to temperature changes. These changes will be very slow as the temperature of the coil can only fluctuate slowly, and as will be seen, slow changes will not affect the operation of the equipment. The screen grid of the pentode valve 44 is supplied with a stabilized voltage so that sudden fluctuations in the mains voltage will not produce "kicks" in the anode current which passes through the winding 34 of the polarized relay 33. As a pentode valve has a flat anode voltage characteristic it is not necessary to stabilize the anode voltage supply.

When there is no error deviation, that is to say when there is zero voltage between the ends of the resistances 26 and 27, the current through the pentode valve 44 is 5*m*A which balances the relay 33 so that the regulating motor 38 is stationary. In this instance, the voltage between the lower end of the resistance 26, i.e., the junction between the resistances 48 and 49, and the grid of the valve 44 is zero and the only voltage applied to the grid is a negative voltage produced across a cathode resistance 51, due to both the anode and the screen currents and the positive bias produced across the resistances 49 and 50.

In one particular application, the value of the voltage across the resistance 51 is −3.25 volts and across the resistances 49 and 50 is +1.8 volts, which gives negative grid voltage of 1.45 volts, which the particular valve used requires to give an output of 5*m*A with a screen grid voltage of 150 volts (supplied by the particular voltage stabilizer 46). The resistance 49 is adjustable to balance the polarized relay 33 when there is no deviation.

As previously stated, the voltage between the junction of the resistances 48 and 49 and the grid of valve 44 is zero, but a voltage must always appear across resistance 48 and across the lower part of potentiometer 40. This voltage is positive with respect to the grid of the valve 44 and must exactly balance the charge on an integrating condenser 52. If if did not balance, an additional voltage would be applied to the grid of the valve 44 which would either increase or decrease the current in the coil 34 of the relay 33. The relay would close contact 36 or 37 and the motor 38 would run until it shifted the brush on the potentiometer 40 so that the voltages balanced and no additional voltage was applied to the grid of the valve 44. The current through the relay coil would be returned to the balance value and the motor stator disconnected. With these voltages balanced, there is no current through resistances 53, 54, 55 and 56, except perhaps for a very minute grid current to the valve 44 which at the maximum would be in the order of 0.1 microamps, and is negligible compared to the values of the rest of the circuit.

When there is an error deviation, that is to say when there is a difference between the actual temperature and the desired value of this temperature, a proportional voltage will appear across the resistances 26 and 27 depending on the setting of the proportional band potentiometer 20. This proportional error voltage will immediately be dropped across the resistances 53, 54, 55 and 56. As the resistances 54 and 55 are equal, and the two resistances 53 and 56 are adjustable together to always have an equal active portion, half the proportional error voltage will appear across the resistances 53 and 54 to alter the grid voltage of the pentode valve 44, altering the current through the winding 34 and making one of the contacts of the relay 33. This in turn will start to operate the regulating unit motor which will move the brush of the potentiometer 40 so that the voltage across the active part of this potentiometer tends to balance the voltage produced across the resistances 53 and 54. As this brush moves, however, it upsets the balance between the voltages of the condenser 52 and the voltage across the resistance 48 and the potentiometer 40 thereby adding an extra voltage to the proportional error voltage which appears across the resistances 26 and 27, and the brush will continue to move due to proportional action, until the voltage across the resistance 48 and the active part of the potentiometer 40 balances the voltage across condenser 52 plus the voltage across resistances 55 and 56. It will be found that when this point is reached the value of the additional voltage applied through the potentiometer 40 is exactly similar to the initial deviation voltage applied across the resistances 26 and 27, and also that the sum of the voltage across the resistances 55 and 56 is equal to this value.

Due to the current through the resistances 53, 54, 55 and 56 which produces the voltage across them, the charge on the condenser 52 will slowly alter; the voltage balance will again be upset on the grid of the valve 44 causing the relay 33 to make the contact operating the motor 38 and slowly drive the potentiometer 40 to maintain balance. This slow action due to the charge of the condenser is the integral action, and its rate is altered by the ganged adjustment of the resistances 53 and 56.

As the motor drives the regulating unit, the amount of heat flow to the building or space is changed to alter the temperature in the sense which rebalances the bridge (Section A) by altering the resistance of the thermometer 1.

Figure 2:
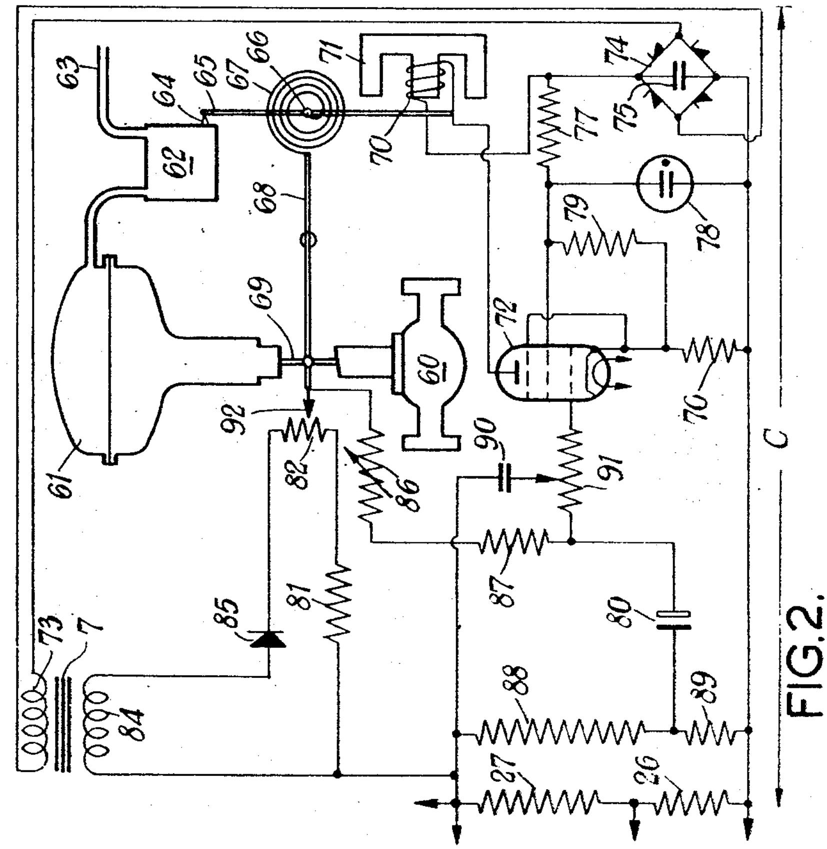
FIG. 2 shows a modification of a portion of the circuit of FIG. 1 to provide for a different form of control and for derivative action.

Another embodiment of this invention is shown in FIG. 2 where the detecting bridge (Section A) and the amplifier (Section B) up to and including the resistances 26 and 27 are exactly similar to the previous description and are not shown.

In this embodiment the regulating unit is shown as a control valve 60 which is operated by an air diaphragm unit 61, which receives its signal from an air relay 62, the power being derived from a compressed air supply 63. This air relay 62 is operated by an air bleed from a nozzle 64 which can be covered by a flapper 65. This flapper is pivoted about the point 66, and has a control spring 67 which is actuated through a lever 68 from the stem 69 of the said valve 60. This lever 68 is arranged in such a manner as to give negative feedback from the valve, e.g. if the flapper 65 is moved away from the nozzle 64, the air supply to the valve diaphragm 61 will alter causing the stem 69 to move, and this movement is transmitted through the lever 68 to the spring 67 in such a sense as to restore the position of the flapper 64 by tending to move it nearer to the nozzle 64. On the lower end of the flapper 65 is mounted a moving coil 70 which is associated with the flux of a permanent pot magnet 71. Different currents in the moving coil 70 will give different forces on the end of the flapper 65 which are opposed by the torque from the spring 67, due to the negative feedback from the valve. Therefore, a system is provided where the position of the valve 60 will be proportional to the anode current from a pentode valve 72 flowing through the coil 70.

The anode voltage for the valve 72 is obtained from a winding 73 on the mains transformer 7, rectified by a full-wave rectifier 74 and smoothed by a condenser 75. This voltage is applied to the anode through the coil 70 on the magnet system 71, and is connected back to the cathode via a cathode resistance 76. The rectifier 74 also supplies a voltage via a resistance 77 to a stabilizing tube 78. This stabilized voltage is connected directly to the screen grid of the valve 72 in an arrangement similar to that previously described. This stabilized voltage also supplies a current through a resistance 79 and the resistance 76, the current through the resistance 76 producing an additional negative bias voltage on to the grid of the valve 72.

With no error across the resistances 26 and 27, the voltage applied to the grid of valve 72 is the sum of the charge on an integral condenser 80 and the voltage across the resistance 76. This voltage across resistance 76 is produced due to the anode current, the screen grid current, and the current through the resistance 79. With no error, the charge on the condenser 80 would ultimately reach the value of the voltage across a resistance 81 and the active part of a potentiometer 82, the voltage across these resistances being derived from a winding 84 on the main transformer 7 and rectified by a half-wave rectifier 85. This voltage charges the condenser 80 through an adjustable resistance 86 and a fixed resistance 87, which are used as the adjustment for the integral time (rate of charge of the condenser 80). In this instance it is necessary to have an additional voltage across the resistance 81, as the integral condenser 80 is of the polarized type, and must always have a voltage applied to it of the same polarity.

An error voltage across the resistances 26 and 27 due to a deviation in the temperature is divided between resistances 88 and 89 according to their values. In this particular instance the ratio is 10 to 1, the resistance 88 being the larger. The part of this voltage which appears across the resistance 89 is applied directly as a voltage to the grid of the valve 72, giving a direct shift in the anode current through the coil 70 and causing a quick change in the position of the valve 60. This is the proportional element of the controller and this change will be directly proportional to the deviation.

The part of the error which appears across the resistance 88 charges the condenser 80 through the resistances 86 and 87, which gives a slow alteration of the grid voltage and hence the anode current, which is proportional to the integral of the deviation and causes the integral element of the controller. The voltage across the resistance 88 also charges a condenser 90 through the active part of a potentiometer 91. The charging current of this condenser 90 gives a voltage drop across the potentiometer 91 which is added to the grid voltage of the valve 72, and this voltage is proportional to the first derivative of the deviation and causes the derivative element of the controller.

With this type of integrating circuit, a nonlinearity is usually produced due to the back E.M.F. of the charge on the condenser reducing the charging current in the usual exponential curve. This difficulty is partly overcome by the value of the resistance 88 being large as compared to the resistance 89 which means that only the first portion of the exponential curve is employed as the value of the voltage which charges the condenser is substantially greater than the actual voltage the condenser is charged to. In spite of the fact that the circuit only works at the beginning of this curve, nonlinearities will still result and these are compensated for by the movement of the brush 92 over the potentiometer 82 by the valve stem 69. This part of the apparatus is so designed that the additional voltage added to the charging circuit by the potentiometer 82 is exactly proportional to the voltage change of the condenser 80 which produces a change in the position of the brush 92. This means that as the condenser 80 charges up, the value of the voltage applied from the potentiometer 82 is altered correspondingly. As this compensation is only of a secondary order due to the 10 to 1 ratio between the resistances 88 and 89, it is not usually necessary to stabilize the voltage supply to the potentiometer 82.

The chief differences between the circuits of FIG. 1 and FIG. 2 is that in FIG. 1 the output of the pentode valve 44 is always balanced against the same current when there is no deviation, while the pentode valve 72 in FIG. 2 has a variable output current which is determined by the integral of the deviation, and is therefore not always the same value with no deviation.

Figure 3:
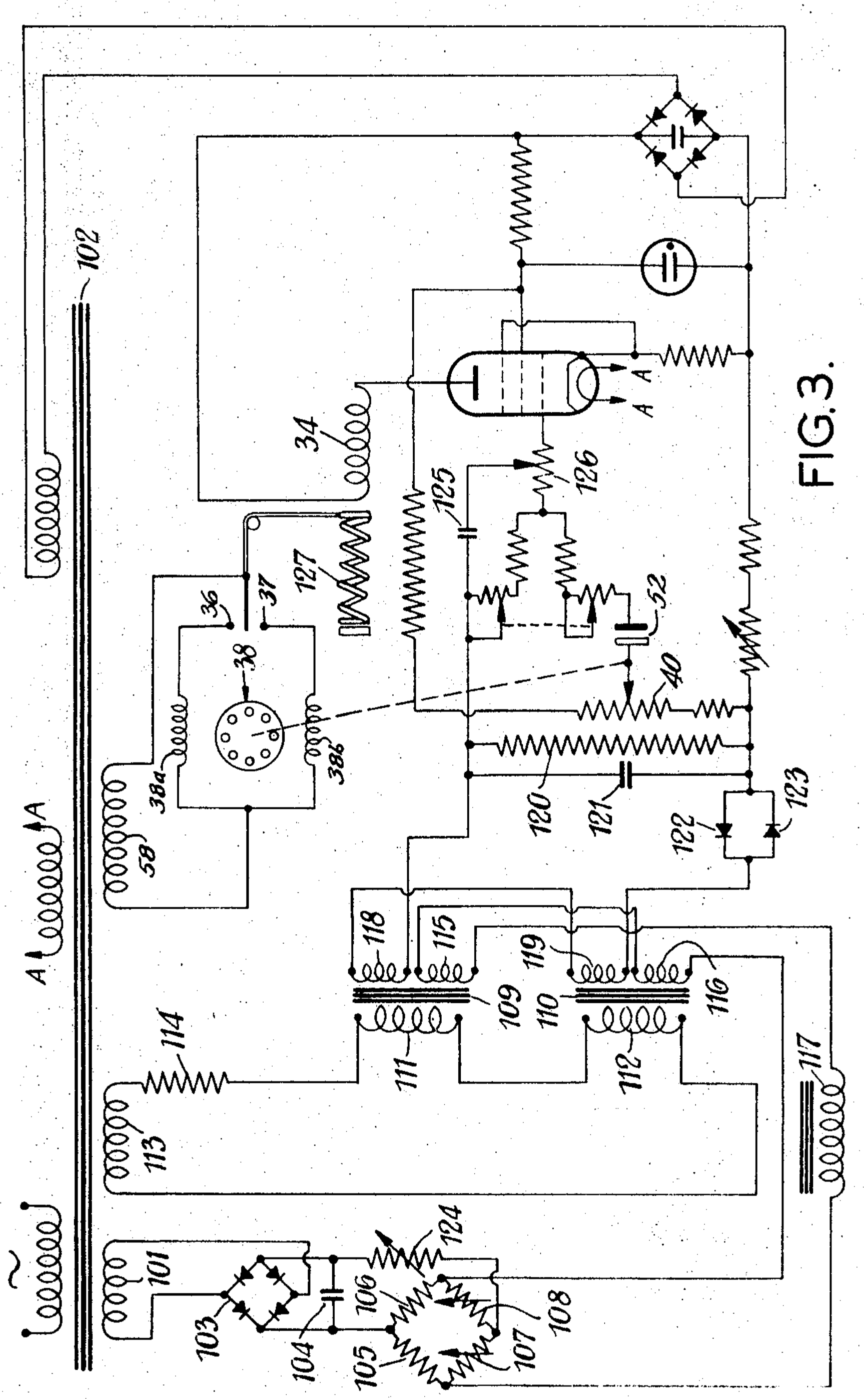
FIG. 3 is a circuit diagram of an alternative embodiment, which is similar in some respects to FIG. 1.

The embodiment shown in FIG. 3 uses a push-pull AC output magnetic amplifier to amplify the small out-of-balance signals from the resistance bridge. For this reason it is necessary to energize the primary resistance bridge with a DC voltage which is obtained from a winding 101 on a mains transformer 102, being rectified by a full-wave bridge rectifier 103, smoothed by a condenser 104 and applied across the bridge as shown through a variable resistance 124.

The ratio arms are resistances 105 and 106 and are both of equal value. A variable resistance 107 represents the resistance thermometer, which is situated in the space to be controlled. A variable resistance 108 gives the desired value setting and is used to adjust the desired value of the space to be controlled, by making its resistance equal to that of the resistance 107 at the desired temperature. The magnetic inverter consists of two iron cores 109 and 110. These are energized by two primary windings 111 and 112 which are supplied with alternating current from a winding 113 on the mains transformer 102. A limiting resistance 114 is included in the circuit so as to limit the maximum currents that will flow when the cores are saturated. Two control windings 115 and 116 on the iron cores 109 and 110 are connected in opposition relative to the primary windings 111 and 112. These two control windings are connected to the output from the resistance bridge 105, 106, 107 and 108 via an iron core choke 117, which is included in this circuit to prevent second harmonics. Two output windings 118 and 119 which are connected in the same sense as the control windings 115 and 116 are also situated on the iron cores 109 and 110. With no currents through the control windings 115 and 116 there will be no output from the output windings 118 and 119, as they are adjusted so that the effect of the energized windings 111 and 112 exactly cancel each other out. This circuit is also arranged so that the energized windings run the cores into saturation over most of the cycle. When a current is passed through the control windings 115 and 116, one core will saturate slightly before and the other slightly after the usual point in the time cycle. This will cause an asymmetrical flux in the cores which will be picked up as a second harmonic signal in the output windings 118 and 119. These output windings are connected to a resistance 120, which is shunted by a condenser 121, through two rectifiers 122 and 123, which are connected back to back. Due to the nonlinear characteristics of the rectifiers when the voltage pulses from the windings 118 and 119 charge the condenser 121, say through the rectifier 123, the condenser will not completely discharge through the rectifier 123, the condenser will not completely discharge through the rectifier 122 as the voltage on the condenser will be small with respect to the voltage across the windings, and therefore the resistance of rectifier 122 will be higher during the discharging interval than was the resistance of rectifier 123 during the charging interval. If the current through the control windings 115 and 116 is reversed the rectifier action will be reversed and the condenser 121 will receive a charge of the opposite polarity. This type of magnetic amplifier is chosen for this application because of the extreme zero stability, but can be replaced by any other device achieving the same results. The voltage which appears across the resistance 120 is proportional to the error as its value is proportional to the deviation of the temperature from the desired value for any given setting of the variable resistance 124. When there is no deviation there will be no voltage across the resistance 120.

The rest of the circuit is similar to that described in FIG. 1 except for the addition of a derivative circuit, and the output relay where the current in the anode coil 34 is balanced against the force of a spring 127. The operation of the derivative circuit is similar to that described in FIG. 2 but uses a condenser 125 and a potentiometer 126 in place of the condenser 90 and the potentiometer 91.

In the controllers described, it is possible to arrange the polarity of the error signal and the rotation of the motor 38 so that the condenser 52 has no charge when the regulating unit is either fully opened or fully closed. It is, therefore, possible due to integral action to make the valve open or close when mains supply is restored after failure. This very important feature is due to the fact that the network feeding the condenser 52 is arranged in such a way as to charge it in one direction only. During mains supply failure, therefore, the condenser discharges independently of the position of the brush on the potentiometer 40. When the mains supply is restored the charging current of the condenser will make the motor move in the direction selected by the layout.

The effect of this feature is best described by an example. If, for instance, any of the controllers previously described is used for controlling the roof temperature of an open hearth furnace, the roof temperature of which has to be kept constant very near the danger limit, failure of the mains supply would leave the servo operating the gas valve in its previous position presumably on the control point. The gas would continue to enter the furnace at the previous rate and the temperature would be kept constant. All the controllers described have the common quality that the integral condenser would start discharging during such a mains supply failure to introduce an apparent error and, by the means described, it is now possible to make sure that after the restoration of the mains supply, the charging current of the condenser would not (in spite of the absence of a true error) open the gas valve and therefore endanger the roof through overheating. Whatever might have been the position of the potentiometer previous to the failure, the layout can be arranged in such a way that the discharging current will cause the valve to close, and no harm can be done to the controlled plant.

One of the features which are common to all the controllers described is the use of servo mechanisms for the correction or production of the integral action element, whereby the error in the forward loop is obtained by means excluding servomechanisms, i.e. means which are continuous and without backlash and hysteresis.

Figure 4:
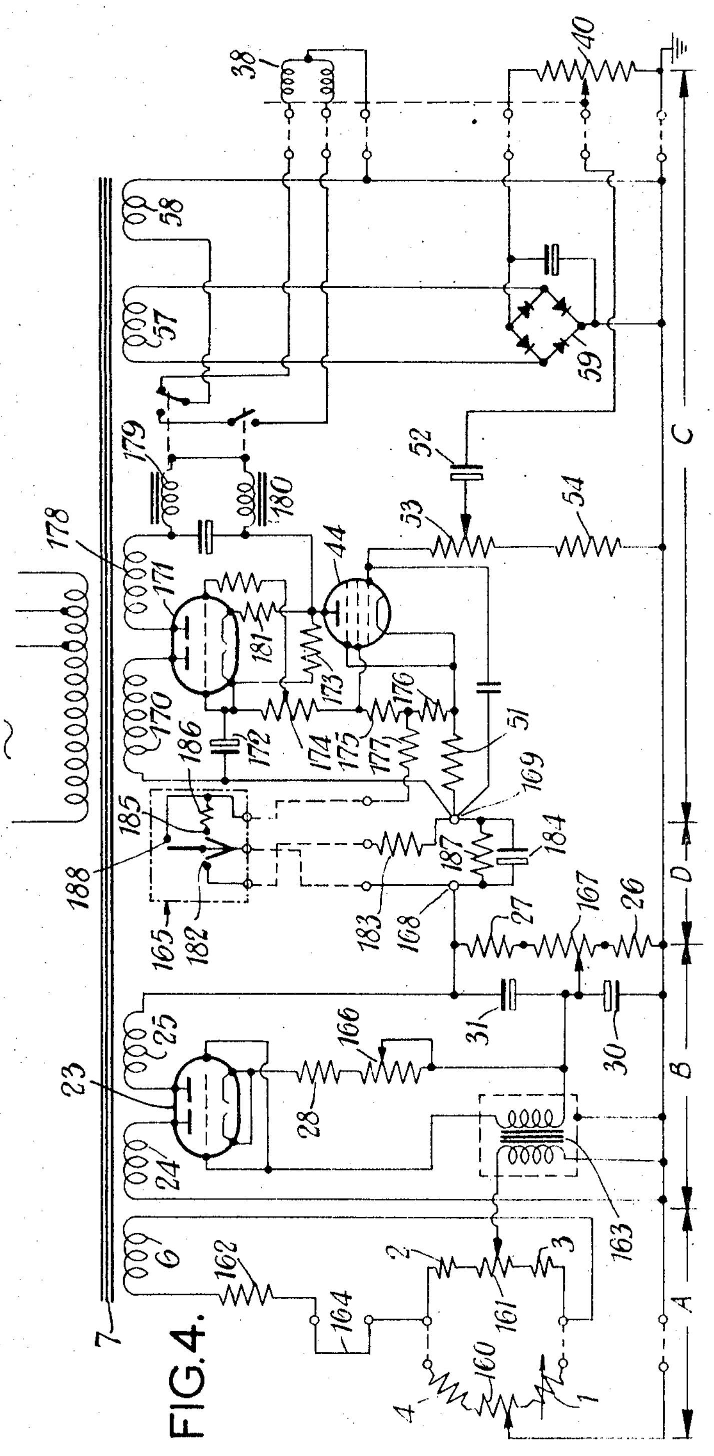
FIG. 4 is a further modification of the circuit of FIG. 1.

FIG. 4 shows an alternative arrangement of the controller described in FIG. 1, the only major addition being the inclusion of a low limit circuit which limits the closing of the regulating unit, should some temperature other than the controlled temperature but related to it have to be maintained above a certain value. Certain modifications have been carried out in the circuit of FIG. 4, and these are as follows:

In the bridge-measuring circuit (section "A") the desired value setting is now provided by an apex potentiometer 161, and a balanced trim potentiometer 160 has been fitted to the bridge. A resistance 162 is included in the supply to the bridge to limit the short circuit current, and a link 164 is provided to disconnect the bridge voltage for the trimming operation of the phase discriminator by means of a potentiometer 167. The three dotted lines which connect the resistance 4, the trim potentiometer 160 and the resistance thermometer 1 to the rest of the bridge circuit represent the external connections to the resistance thermometer, and these are so arranged that the circuit does not have to be balanced for capacity or resistance in these loads.

Section "B" which is the amplifying section, has been simplified by using a voltage transformer 163 in place of the double triode 9 shown in FIG. 1. This has two main advantages; firstly, it is possible to tie one side of the measuring bridge down to the earth line of the controller due to the electrical insulation properties of the transformer, and secondly it eliminates the additional HT supply and the winding 10 on the mains transformer 7. The action of the phase discriminator 23 is the same in both circuits. Resistance 166 is used for adjustment. The proportional band can be adjusted in various ways which, however, are not shown on this drawing. The output of the phase discriminator valve 23 is connected as before to the resistances 26 and 27 but an adjustable potentiometer 167 is provided. Instead of using this potentiometer, it is possible to leave it out and to use for the adjustment of the bridge the potentiometer 174 that has been mentioned previously. The proportional element of the controller can be adjusted by means of a potentiometer connected in parallel to the resistances 26 and 27. The output from the discriminator triodes 23 passes to the resistances 26 and 27 as before, but in this instance the trim potentiometer 167 is included and is used to balance the circuit when the link 164 is removed.

As this amplifying part of the circuit is in the forward loop, it is essential that no mechanical linkage, such as an automatic potentiometer, be used. Due to the step effect of the mechanical brush going over the slide wire, backlash is present and may cause oscillation when the controller is set to its optimum values.

An additional Section "D" has been added to FIG. 4 and comprises a low limit control. This will be dealt with separately after the action of the controller has been described, and for the present it should be assumed that terminal 168 is directly connected to terminal 169. The proportional voltage drop across the resistances 26, 167 and 27 is applied to the grid of the pentode valve 44 through the resistances 54 and 53 as in FIG. 1, and the feedback resistance 51 is connected in series with the cathode. The controller action is obtained by the feedback from the potentiometer 40 through the condenser 52 as in the previous example, a DC voltage being maintained across the potentiometer 40 from the winding 57 of the mains transformer 7 and the rectifier and smoothing unit 59. The high tension for the pentode valve 44 is obtained from a winding 170 of the mains transformer 7, being rectified by the left-hand half of a double triode valve 171 and smoothed by an electrolytic condenser 172. The negative side of this condenser 172 is connected to the cathode of the valve 44 via the cathode resistance 51 and the positive side is connected to the anode of the valve 44 via a load resistance 173. A potential divider train consisting of a potentiometer 174, resistances 175, 176 and 51 is also connected across this supply. The additional current, due to this potential divider train, through the cathode resistance 51 causes an additional bias on the grid of the valve 44. A screen voltage of the appropriate value is taken from the junction of the resistances 174 and 175, while another supply between resistances 175 and 176 is taken through a very high resistance 177 for the low limit control which will be described hereinafter.

The right-hand half of the double triode valve 171 is fed with an AC voltage from a winding 178 and feeds two output relays 179 and 180, the circuit of this valve being completed through a cathode resistance 181 which gives it a certain amount of negative feedback. The voltage applied to the grid of this triode is the difference between the voltage of the upper half of the potentiometer 174 and the drop across the anode resistance 173 of the pentode valve 44. These voltages are so arranged that as the current increases through the valve 44 the direct current will also increase in the right-hand triode of the valve 171. A certain amount of voltage stabilization is obtained as this is virtually a bridge circuit. The current through the relay coils 179 and 180 is adjusted so that when no error voltage is applied to the grid of the valve 44, the armature is closed on the relay 179 and open on the relay 180. With an increase in current from the valve 171, the relay 180 will close causing the reversible split phase induction motor 38 to drive the feedback potentiometer 40 in one direction, and with a reduction in current the relay 179 will open, causing the motor 38 to run in the other direction. In the drawing both relays 179, 180 are shown open. An interlock is provided by equipping the relay 179 with change over contacts so that if both relays close it is not possible to energize both stators of the motor at the same time. It will be seen that the chief differences of this Section "C" from that of FIG. 1 is that a thermionic valve and two ordinary relays are used in place of the sensitive polarized relay 33 of FIG. 1.

The object of the low limit control D is best described by taking the example of a heating system where a space is heated by hot air from a delivery duct. In this case, the resistance thermometer 1 would measure the temperature of the space which it is desired to keep at a constant level and the regulating unit driven by the motor 38 would control the heat supplied to the hot air in the delivery duct. In this type of installation it may be desirable for comfort reasons to limit the lowest level of the temperature of the air in the delivery duct even if the space temperature should increase above the desired value. Referring to FIG. 4, unit 165 represents a temperature-detecting element (thermostat) in the air duct. When this temperature is above the low limit, contacts 182 are closed and short the terminals 168 and 169 through a relatively low resistance 183 which removes any charge from a condenser 184 and the circuit operates as has already been described. When the low limit is approached the contacts 182 open and contacts 185 make. The condenser 184 is then slowly charged up through resistances 177 and 186, the terminal 168 becoming positive. A resistance 187 in parallel with the condenser 184 limits the maximum voltage thereon and also starts to discharge it when the thermostat is in such a position that neither contacts 182 or 185 are made. This slow building up of a voltage across the condenser 184 acts as an additional error voltage in such a direction as to increase the heat to the delivery duct. Should this effect be too slow, the temperature in the delivery duct will fall still further, making the contacts 188 and shorting the resistance 186 to increase the charging current. When the duct temperature increases, this process is reversed, the charge being removed from the condenser 184 firstly by the resistance 187 and secondly by the resistance 183. If these conditions persist the temperature will slowly oscillate as the condenser 184 charges and discharges.

It is possible by reversing the direction of the error across the resistances 26, 167 and 27 and the connection of the relays 179 and 180 to use this additional circuit to limit a high value of the temperature if so desired.

Figure 5:
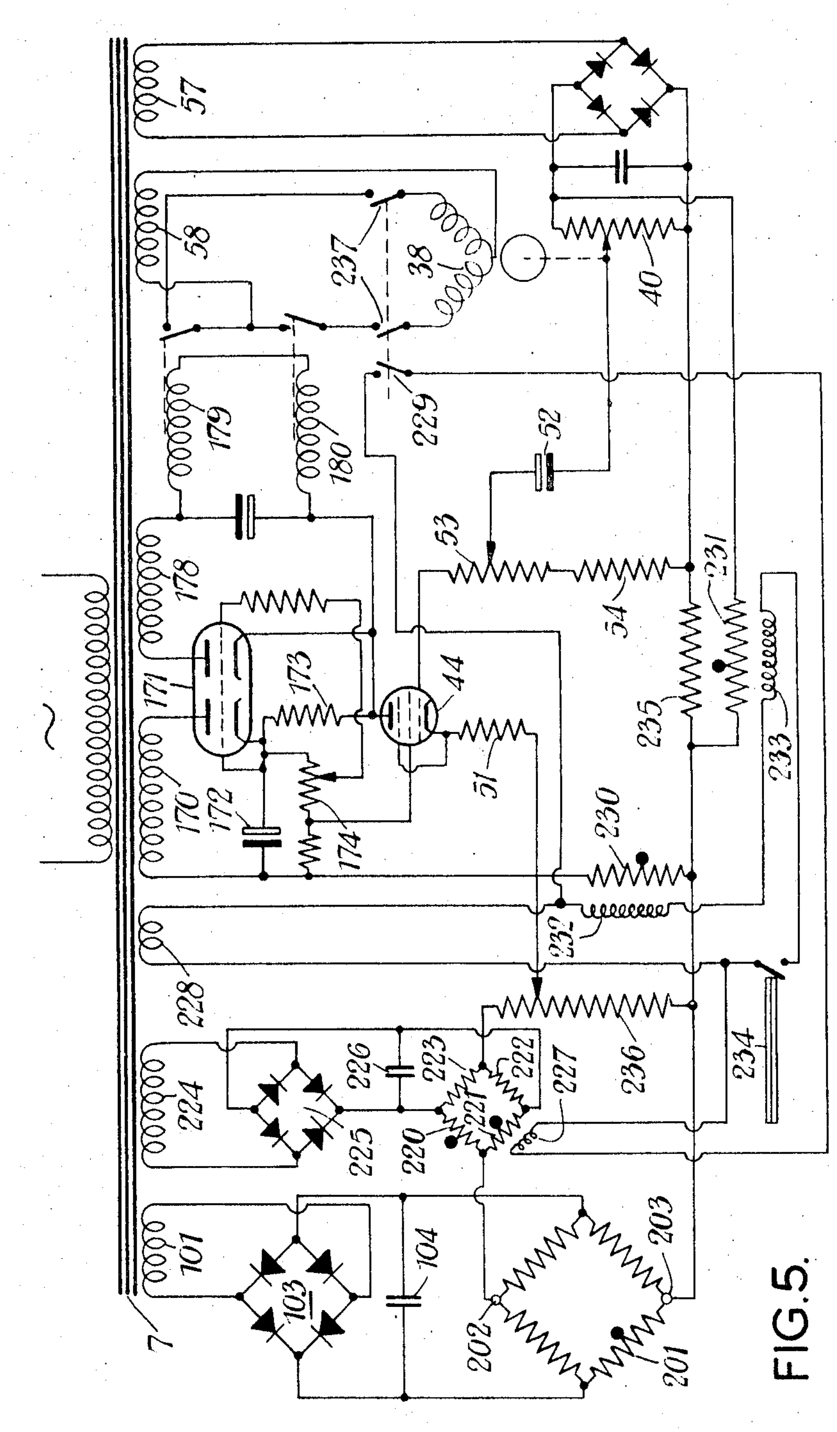
FIG. 5 is a modification of the circuit shown in FIG. 4 and providing for limiting action.

FIG. 5 illustrates an embodiment of the invention similar to FIG. 4 except that Sections "B" and "D" are omitted. This is possible by using a thermistor as the detecting element instead of a resistance thermometer, the temperature coefficient of the thermistors being approximately 12 times as great. Also by using a thermistor of a higher ohmic resistance than a wire resistance thermometer it is possible to get voltages from the initial bridge almost 20 times as great as the voltage from the previously described resistance bridge for the same temperature change, with a unit which is much smaller.

Referring to FIG. 5, a thermistor 201 has a very high negative temperature coefficient. In this instance, the bridge is energized by a DC voltage as in the case of FIG. 3, and this voltage is obtained from the winding 101 on the mains transformer 7 and is rectified by the full wave bridge rectifier 103. The voltage appearing across the main bridge between points 202 and 203 is comparable with the voltage across the resistances 26 and 27 in the previous embodiments. When the bridge is balanced, that is the controlled medium is at the desired value and no deviation is present, the voltage between the two points 202 and 203 is zero. This voltage will increase proportionally to the deviation, the polarity depending on the sense of the deviation. It will be seen that there is a great saving in components by this type of control, but it is only possible when wider proportional bands are used, the amplification in these instances being smaller.

A proportional band adjustment may be fitted as an attenuator on the winding 101 of the main transformer 7, or as shown by a potentiometer 236 on the output of the bridge between points 202 and 203.

The remainder of the controller acts as has been described with reference to FIG. 4, but with two additional features, both of which are operated by indirectly heated thermistors. The first feature gives a shift of the desired value which is used on batch processes to prevent excessive overshooting of the control point, and the second feature is a low limit control by an alternative method to that described with preference to Section "D" of FIG. 4.

An additional bridge circuit consisting of a thermistor 220, a thermistor 221, a resistance 222 and a resistance 223 is incorporated to give a shift to the desired value when the plant is starting up. This bridge circuit is energized from a winding 224 on the mains transformer 7, the voltage from which is rectified by a bridge rectifier 225 and smoothed by a condenser 226. An independent heater winding 227 heats the thermistor 221 and is energized from a winding 228 on the mains transformer 7 when a switch 229 is closed. The object of having the thermistor 220 in this bridge circuit is to give ambient temperature compensation when the winding 227 is not energized, so that no voltage will be introduced into the main circuit.

When the plant starts up, it is usual for the regulating unit to go to the fully open position until the controlled medium reaches the desired value and when this is reached it will start to close according to the controller functions until a state of equilibrium is reached. In plants with a long time constant it takes a long time until a change in the position of the regulating unit becomes effective in the plant and the desired value is not reached without an overswing. This is avoided in the present design. The regulating unit motor shown is a shaded pole type with split stators, one of the stators being energized to open the regulating unit and the other to close it. When the motor reaches the end of its travel in either direction a switch 237 is automatically opened in the supply to the stator which causes rotation in that direction so that the motor is not overloaded.

The switch 229 which is operated when the motor 38 is in its fully open position switches the current to the heater 227 heating the thermistor 221. This throws the secondary bridge out of balance and lowers the control point by a predetermined amount, so that controller action will start when the controlled medium reaches this lowered desired value. As the controlled action starts, this switch 229 is opened and the thermistor 221 will slowly cool, returning the desired value to the correct level at a predetermined rate. By this means, excessive overshooting is eliminated as the plant swings into control.

For the low limit control, two thermistors 230 and 231 are used and are independently heated by heaters 232 and 233 respectively, the voltage being taken from the winding 228 on the mains transformer 7 and being switched by a bimetallic thermostat 234 which is situated in the medium, whose low limit of temperature it is desired to control. With the switch 234 closed, the two thermistors reduce their ohmic value, and the action of the thermistor 230 is to minimize the proportional error input to the valve 44 due to error signal from the primary bridge. At the same time the thermistor 231 introduces a current through a resistance 235 from the same DC voltage which is maintained across the feedback potentiometer 40; this voltage slowly building up across the resistance 235 affects the regulating unit in an exactly similar manner to the voltage which slowly builds up across the resistance 187 in Section "D" of FIG. 4, but there are the additional advantages in this case, firstly, that this rate need not be as quick as in the previous example due to the thermistor 230, also that the circuit to the thermostat 234 is independent from the main control circuit.

The additional potentiometer 236 is used as a proportional band adjuster by attenuating the output signals from the main bridge. Obviously a symmetrical arrangement can be used for high temperature limit control.

Figure 6:
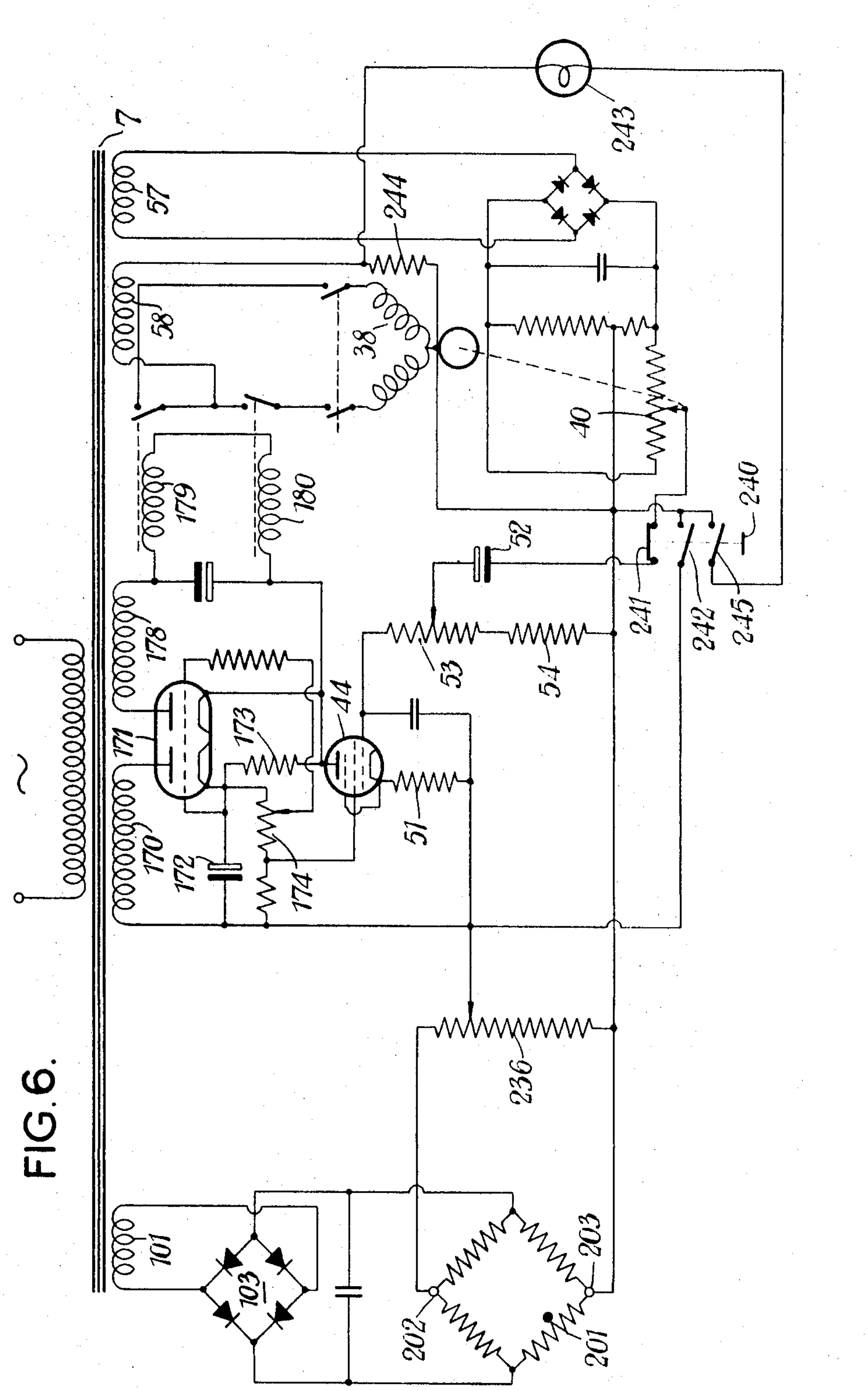
FIG. 6 is a modification of FIG. 4 providing for resetting facilities.

FIG. 6 shows a controller similar to that described with reference to FIG. 4 and which has two additional features, one being a stabilizing circuit which enables the controller to be realigned when a valve is replaced and particularly high accuracy, for instance down to a small part of a degree fahrenheit, is required. This procedure is desirable as small shifts, in the desired value may occur if the valves have slightly different characteristics.

The other feature shown is a small reverse voltage which may be applied to the integral condenser giving an symmetrical position after current failure, for due to their characteristics even electrolytic condensers are able to stand 1 volt reverse potential without causing any damage. This feature prevents a complete closing of the regulating unit when the controller is started up after a mains failure.

The first device consists of a pushbutton 240 which has three actions; firstly, its contact 241 open circuits the feedback in the lead to the grid condenser 52. Secondly, a contact 242 shorts out any proportional error from the main bridge, and thirdly it switches a lamp 243 across a resistance 244 by means of a contact 245. This lamp is extinguished when the regulating unit is stationary, but will light should it move in either direction, as the current to the motor passes through the resistance 244, and the voltage across this resistance is applied to the lamp. When the pushbutton 240 is pressed, the potentiometer 174 is adjusted until the lamp is extinguished to line up the zero position of the controller. It is possible to operate the motor of the servomechanism through a magnetic amplifier instead of using the relays.

In some instances it is desirable that the control function should be represented by duration of time rather than actual position of the regulating unit. For this method of control, the regulating unit oscillates between fully open and fully closed positions at some preselected means frequency and the duration of time that the unit is open during this cycle is controlled by the controller functions.

Figure 7:
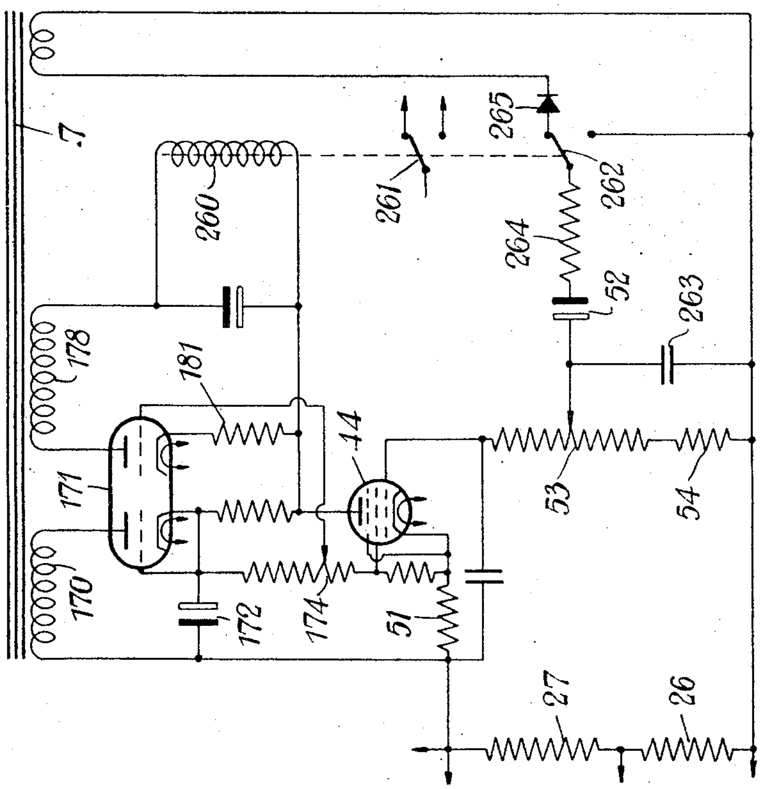
FIG. 7 is a still further modification of a portion of the circuit of FIG. 1 for use where the regulating unit is not infinitely variable in its positioning.

In order that this type of operation may be easily understood, FIG. 7 shows the circuit of such a scheme. The first two sections of this controller are exactly similar to Sections "A" and "B" of FIG. 1 and are not shown, and Section "C" is similar to Section "C" in FIG. 4 except that the output current from the right-hand half of double triode 171 only passes through a single relay 260 instead of through two relays 179 and 180 as in the previous example. Relay contacts 261 switch the regulating unit on or off in place of the motor 38 in the previous circuits, and the feedback is switched by contacts 262 instead of being obtained by the variable potentiometer 40.

The time cycle of the switching is adjusted by a condenser 263 and resistance 264 which are additions to the feedback circuit. The condenser 52 and the resistances 53 and 54 carry out exactly the same functions as before. When the contacts 262 switch a rectifier 265 into circuit, the condenser 263 increases its charge and builds up the voltage across the resistances 53 and 54 which will switch the output relay 260 through the pentode valve 44 so that the lower contact of switch 262 is made and the condenser 263 is gradually discharged. This cycle of events continues giving the same duration of on and off time if the condenser 52 has a charge equivalent to half the voltage from the rectifier 265.

Should an error occur across the resistances 26 and 27 an additional bias is added to the circuit causing the contacts to be open or closed for a longer duration and the charge on the condenser 52 will slowly integrate away, cancelling any offset. In case of a failure of the mains the controller will alter the controlled physical value in a preselected sense.

Figure 8:
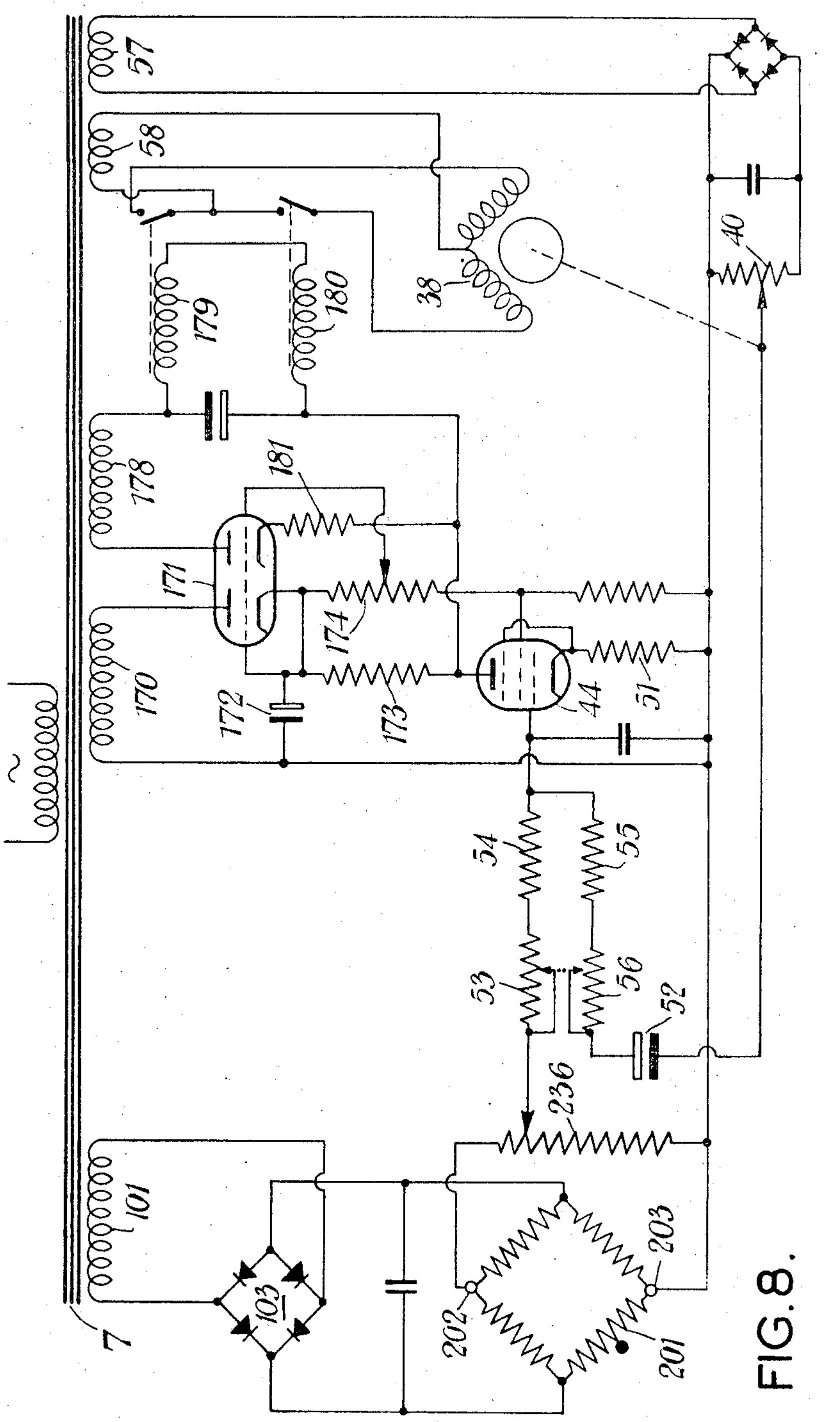
FIGS. 8 and 9 show further embodiments.

The circuit of FIG. 8 shows the bridge circuit of FIG. 5 incorporating the thermistor 201. The output of this bridge is fed via resistors 53, 54, 55 and 56 arranged as in FIG. 1 to the valve 44 whose output passes to the valve 171 as in FIG. 5, and thus operates the motor 38 through the relays 179 and 180.

Figure 9:
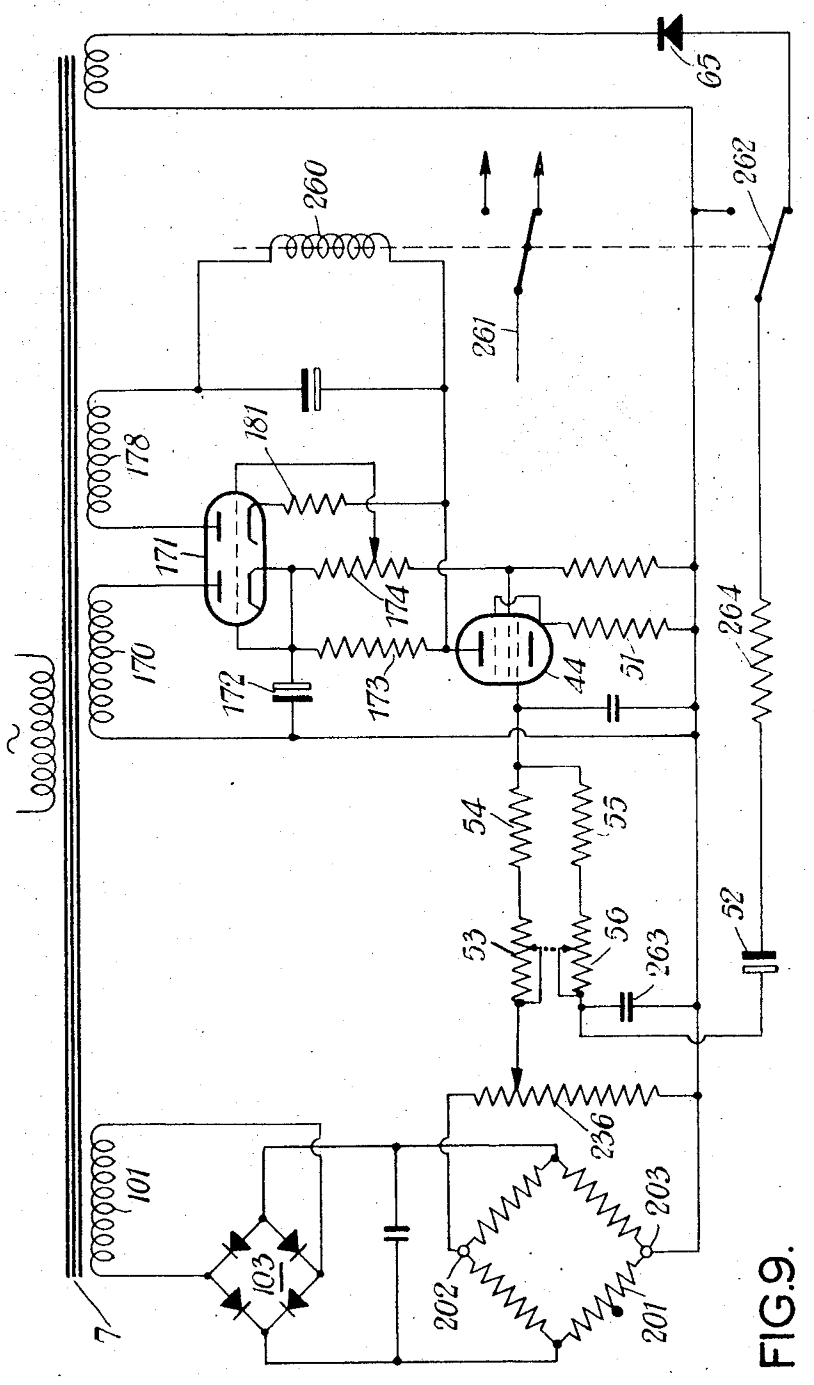

In FIG. 9 the circuit is the same as in FIG. 8 up to the valve 171, but the regulating unit is of the discontinuous type and is controlled by the relay 260 as in FIG. 7.

Figure 10:
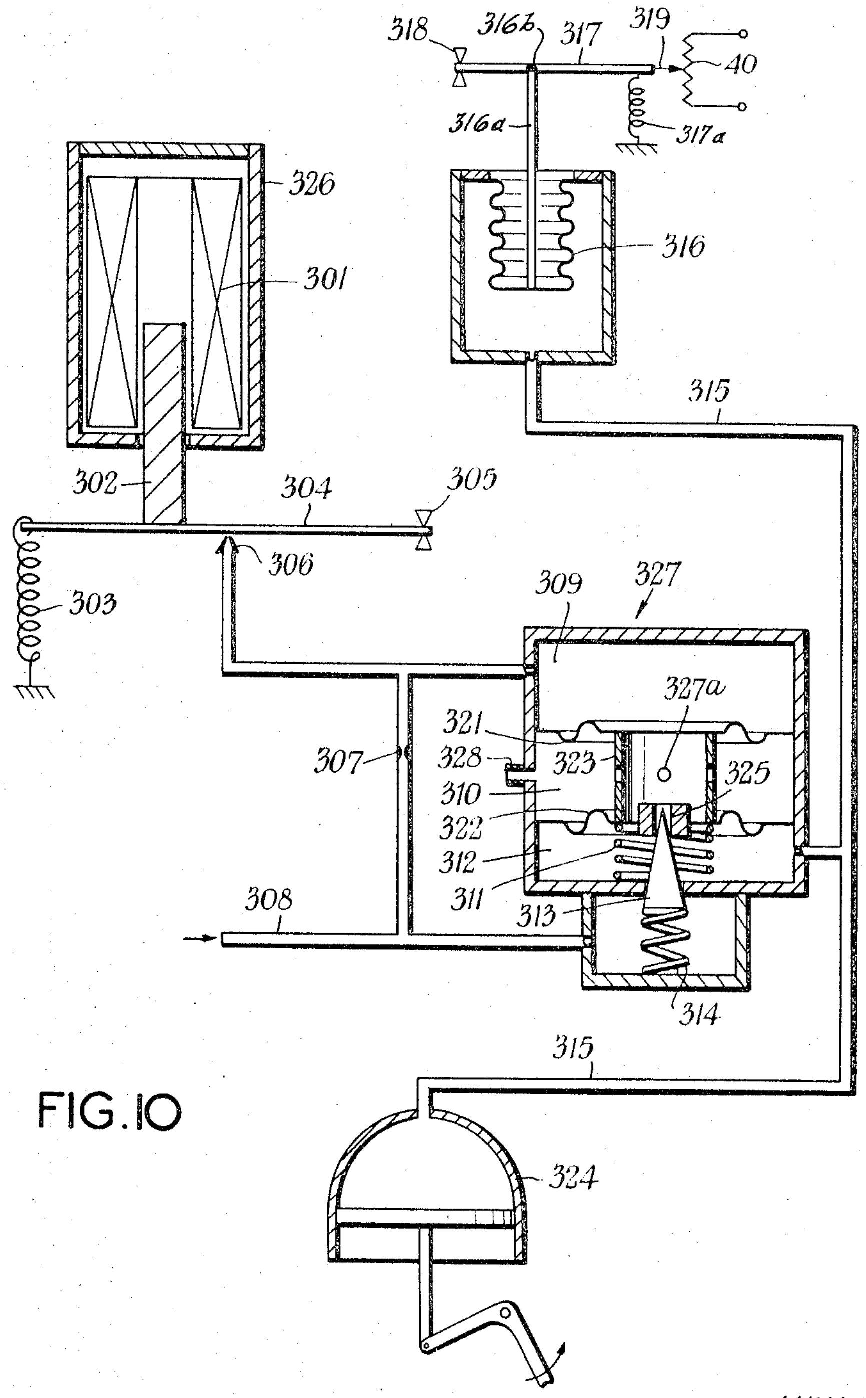
FIG. 10 shows diagrammatically means for operating a regulating unit.

The embodiment shown in FIG. 10 is a portion of apparatus designed to replace part of that of for example FIG. 4. Thus, referring to FIG. 4 it will be observed that the output from the output valve is passed to two relay coils 179 and 180 to activate them selectively, such relay coils controlling the electric motor 38 fed by a winding 58 on the mains transformer and in turn controlling the slider of the potentiometer 40. When incorporating the apparatus of the embodiment of FIG. 10 the above parts with the exception of the feedback potentiometer 40 are removed.

As shown in the drawings, the output from the output valve is passed through a coil 301, this coil being surrounded by a soft iron circuit 326 and enclosing a bar magnet 302 which may be attracted into the coil by the action of the controller output current flowing through the coil. This bar magnet 302 is mounted upon an arm 304 which is mounted in pivots 305, the movement of the bar 302 into the coil being opposed by an adjustable spring 303. The arm 304 covers a nozzle 306 and, therefore, the position of the arm 304, which is dependent upon the output from the controller, controls the airflow from the nozzle 306.

As can be seen from the drawings, a pneumatic amplifier 327 is provided and comprises three compartments 309, 310 and 312 which are separated from one another by two thin flexible diaphragms 321 and 322, these two diaphragms being connected together by a tube 323 located in the compartment 310, such tube 323 having perforations **327*a* in its wall. A COMPRESSION SPRING 311 located in the compartment 312 tends to urge the diaphragms 321 and 322 upwardly and is balanced by the pressure in the compartment 309, the compartment 310 being open to the atmosphere through a vent 328**.

A compressed air supply at a pressure of the order of 20-lbs. per square inch is provided via a pipe 308 and a pipe 315 is connected to a conventional pneumatic valve operator 324 working between say 3 and 15-lbs. per square inch. The compressed air supply in pipe 308 is fed to the compartment 312 via a conical valve 313 which is urged upwardly by a spring 314 so that normally the compressed air is not supplied to the compartment. The compressed air is also supplied to the compartment 309 and the nozzle 306 via a restriction 307 in the pipe 308.

When the arm 304 moves away from the nozzle 306, the pressure in the compartment 309 will drop with the result that the diaphragm 322 will move away from the lower side of the amplifier 327 and the valve 313 will close the supply of compressed air to the compartment 312 and will open an aperture 325 communicating with the tube 323 to connect the compartments 312 and 310 together. In consequence the pressure in compartment 312 will be atmospheric pressure and there will be no operating pressure transmitted to the operator 324.

When the arm 304 tends to restrict the nozzle 306, the pressure will build up in the compartment 309 thus bringing the diaphragms 321 and 322 to the position shown in the drawing in which the valve 313 seals the aperture 325. If the nozzle 306 is still further restricted, additional pressure will build up in the compartment 309 causing the valve 313 to be pushed downwardly against the spring 314 to admit a further supply of compressed air to the compartment 312 and thus to the operator 324.

A pressure responsive bellows 316 is connected to the pipe 315 along with the valve operator 324. Accordingly, the same pressure is applied simultaneously both to the bellows 316 and to the valve operator 324. The position assumed by the bellows 316 will, therefore, correspond to the position assumed by the valve operator 324 in response to the pressure in compartment 312 and pipe 315.

An upright rod **316*a* is connected at its lower end to the diaphragm of the bellows 316. The upper end of rod 316*a* is pivotally connected at 316*b* to a horizontally extending lever 417 intermediate its ends. The bellows 316 displaces the lever 317 against the yielding action of a spring 317*a*. One end of the lever 317 is pivoted to a fixed support at 318 and the other end carries the movable contact 319 of potentiometer 40. In this manner, the movable contact 319 of potentiometer 40 is displaced along with the valve operator 324. The potentiometer 40** is connected into the control system as described above for FIG. 1, for example.

In the controllers described above with respect to FIGS. 7 and 9, relay contacts 261 may control an electrical motor operatively connected to a correcting element which influences the temperature of a medium to which, for example, thermistor 201 (FIG. 9) is exposed.

FIG. 11 is a theoretical circuit diagram of such a controller. It will be seen that this controller comprises a measuring element, an amplifier, a trigger element, and output circuit, a feedback circuit, an electric motor and a correcting element.

The measuring element comprises a bridge circuit having in one arm a detecting element, for example a temperature sensitive resistor exposed to a medium influenced by the correcting element. The bridge circuit provides at its output terminals an error signal which is proportional to the difference between an actual and a desired value of the quantity, for example temperature, to which the detecting element is sensitive. The error signal is amplified by the amplifier so as to produce an amplifier output voltage which varies about a first predetermined value in accordance with the sense and magnitude of the error signal.

The amplifier output voltage is applied to the trigger element and the trigger element provides a trigger output signal which has either a second predetermined value or zero value according as the amplifier output voltage is above or below a further predetermined value.

The trigger output voltage is applied to the output circuit comprising switch means controlling the flow of current from an electrical power source to the electric motor such that the motor is fully energized or deenergized according as the amplifier output voltage is above or below the further predetermined a valve referred to above.

The feedback circuit has its input connected to the input of the motor and its output connected to the measuring element or to the output of the amplifier so as to supply a feedback signal either indirectly or directly to the trigger element. The feedback circuit comprises delay means having a low time constant such that, when the motor becomes energized, the feedback signal, which is delayed in time and which opposes the error signal or the difference between the actual value of the amplifier output voltage and the further predetermined value, appears at the output of the feedback circuit. The effect of the feedback circuit is thus to cause the motor to be deenergized after it has been energized for an interval and the motor is thus supplied, during periods when the error signal is not zero, with a pulse duration modulated signal comprising pulses of current of constant amplitude and of a length varying in accordance with the error signal. The time interval between the commencement of successive pulses of current is referred to below as the cycling time.

It can be shown that the mean value of the output signal provided by the feedback circuit is proportional to the proportion of time during which the motor is energized. It can also be shown that, assuming the magnitude of the error signal required to cause the amplifier output signal to exceed the further predetermined value to be negligibly small, the mean power supplied to the motor is proportional to the error signal.

The operation of the feedback circuit may, alternatively, be described as follows:

A voltage is generated in a part of the controller preceding the trigger element, which increases and decreases in a sawtooth fashion at a frequency determined by the circuit elements of the controller, the phase of the peak value of the sawtooth waveform varying in accordance with the error signal. This change of phase is due to the fact that the rate of increase of the feedback signal is changed by an output signal of the output circuit of the controller in such a way that the amplifier output voltage reaches the further predetermined value in a longer or a shorter period determined by the proportion of time during which the motor is energized. At the same time the cycling time and pulse duration are limited to a value that is acceptable to the operator.

Preferably, the motor is of the thermal type in which the power supplied to it heats a substance having a high coefficient of thermal expansion over at least a part of the range within which it is stable and the expansion of this substance is used to drive an actuator member in opposition to a restoring force. In a motor of this type movement of the actuator has an approximately linear relationship to the mean power supplied. If, therefore, the motor of FIG. 11 is of this type the movement of the actuator has an approximately linearly proportional relationship to the error signal. Furthermore, if the correcting element is a steam valve or the like, the movement of the valve also has an approximately linear relationship to the error signal. The motor may, alternatively, be of any suitable form arranged to move from a datum position when energized and to move towards the datum position when deenergized. It may, for example, be an ordinary rotary motor subject to a spring or other bias tending to restore it to a datum position.

Movement of the motor changes the operative condition of the correcting element to cause a corresponding change in the condition of the medium, which change is detected by the detecting element. The influence exerted by the correcting element upon the detecting element is indicated by a chain-dotted line.

One embodiment of the theoretical circuit of FIG. 11, of which FIG. 12 is the circuit diagram, is a modification of the circuit of FIG. 9.

In the circuit of FIG. 12, a bridge network 201, 202, 203 comprises a detecting element in the form of an electric thermometer 201 exposed to the temperature of a medium in an enclosed space. The bridge circuit is supplied with DC from a DC source 101, 103 and an error signal is developed across resistor 236. This error signal is applied to the input of an amplifier comprising values 44 and 171, associated resistors 51, 53, 54, 55, 56, 173, 174, 181, associated capacitors 172 and 408 and windings 170 and 178 of transformer 7 arranged as they are in FIG. 9. The amplifier output voltage developed across capacitor 408 is, therefore, a DC voltage which varies about a first predetermined value in accordance with the sense and magnitude of the error signal.

Capacitor 408 is connected across the input of a trigger element comprising a trigger diode 401 and a resistor connected in series. The trigger diode 401 has characteristics such that when the amplifier output voltage is below an upper predetermined value the trigger diode 401 has a very high resistance, when the amplifier output voltage is above the upper predetermined value the trigger diode 401 has a very low resistance and, if the amplifier output voltage then falls below a low predetermined value, the trigger diode 401 again has a very high resistance. In this arrangement, therefore, the further predetermined value referred to above is a range of values extending between the upper and lower predetermined values.

The current flowing through the trigger diode 401 is supplied to an output circuit comprising a silicon-controlled rectifier 402, a secondary winding 404 of transformer 7, a bridge rectifier 403 and a primary winding of transformer 406 connected in series.

When the silicon-controlled rectifier 403 is caused to fire, alternating current is supplied to a load 405, in the form of a heater of a thermal motor of the kind described below with respect to FIGS. 25 and 26.

The feedback circuit comprises a resistor 264 and capacitors 52 and 263 interconnected as described above with respect to FIG. 9 to form a resistance-capacitance time delay means. The feedback circuit also comprises a diode 407 and a secondary winding of transformer 406 connected in series between the remote terminals of resistor 264 and capacitor 263.

When current flows in the heater 405 a voltage appears across the secondary winding of transformer 406 and this voltage is rectified by diode 407. Assuming adjacent terminals of resistor 264 and capacitor 263 to be directly connected as indicated by the dotted line *52a*, so that capacitor 52 is ineffective, a feedback signal is developed across capacitor 263 subject to a time delay dependent upon a time constant determined by the values of capacitor 263 and resistor 264. This feedback signal is applied to the input of the amplifier in opposition to the error signal.

Power supplied to the heater 405 is, as described above, with respect to FIG. 11, proportional to the error signal.

The actuator, indicated schematically by the dotted line *405a*, of the thermal motor is operatively connected to a correcting unit arranged for varying the temperature of the medium to which the detecting element 201 is exposed. The correcting unit comprises, for example, a steam valve or the like 410 arranged for controlling the flow of steam to a heat exchanger (not shown) for exchanging heat from a supply of steam to the medium. Movement of this valve is, as described above, proportional to the error signal and its effect upon the detecting element 201 is indicated by a chain-dotted line.

If the connection 52a is removed, so that capacitor 52 becomes effective, the mean power supplied to heater 405 has two components one of which varies in proportion to the error signal and the other of which varies in accordance with the time integral of the error signal. The actuator 405a and the valve 410 then have corresponding components of movement and the controller provides a proportional plus integral control effect.

An active detecting element, for example, a thermocouple, may be substituted for the passive resistance thermometer but the amplifier will then usually be required to have a higher amplification.

In order to reduce the cycling time the arrangement of FIG. 12 may be modified as shown in FIG. 12a by adding a second feedback means including a mechanical link. In this modified arrangement the bridge circuit includes a slider 409a which is operatively connected to the actuator 405a and moves over a resistor 405 for making adjustable connection thereto. The slider 409a forms one input terminal of the bridge circuit and movement of the actuator 405a causes movement of the slider 409a in a direction to restore the bridge circuit to balance, in addition to causing movement of valve 410 to produce a like effect. In this way the motor may be given a very fast transfer function and the cycling time may be reduced to less than 5 seconds.

It is, however, usual to locate the controller a substantial distance from the bridge circuit and this modified arrangement has the disadvantage that two additional long connecting leads are then required to connect resistor 409 to the bridge circuit.

FIG. 13 is a circuit diagram of a second embodiment of the theoretical circuit of FIG. 11.

The measuring element of the controller of FIG. 13 comprises a bridge circuit having a detecting element in the form of an electric thermometer 501 connected in one arm, a resistor 501a and a slider 501b connected to form one output terminal of the bridge circuit. The balance condition of the bridge circuit can be varied by adjustment of the position of slider 501b with respect to the resistor 501a. The input of the bridge circuit is connected for energization from secondary winding 511 of transformer 7 and it produces an alternating error signal having a phase dependent upon whether the actual valve of the temperature of the electric thermometer 501 is greater or less than a desired value, the magnitude of the error signal being proportional to the magnitude of the difference between the actual and desired values of temperature.

The amplifier of the controller of FIG. 13 comprises an input transformer 512, transistor 513 and associated circuit elements connected in known manner for amplifying the alternating error signal and a discriminator to which the amplified alternating error signal is applied. The discriminator comprises a transistor 514 and associated circuit elements connected in known manner for discriminating the phase of the amplified error signal and for producing across parallel connected capacitor 515 and resistor 516 a direct voltage which is greater or less than a predetermined value depending upon the phase of the error signal and which differs from this predetermined value according to the magnitude of the error signal.

The trigger element of the controller of FIG. 13 comprises directly coupled transistors 517 and 518 arranged in known manner such that they are fully conducting or nonconducting according as the signal applied to the base of the transistor 517 rises above or falls below predetermined values. The trigger output voltage developed across resistor 519 is, accordingly, either a maximum or zero.

The output circuit of the controller of FIG. 13 comprises a silicon controlled rectifier 520 connected in series with the DC terminals of a bridge rectifier 527. The terminals of bridge rectifier 527 are connected across winding 528 of transformer 7.

The silicon controlled rectifier 520 is gated by the trigger output voltage and thus pulses of current flow through load element 521, which may be the heater of a thermal motor or the equivalent of any other suitable motor.

In the feedback circuit of the controller of FIG. 13 a capacitor 522, a resistor 523 and a parallel circuit comprising resistor 524 and diode 525 are connected in series across the output of the output circuit to form a resistance-capacitance delay means. The capacitor 522 is connected in series with resistor 526 to the input of the trigger circuit and the arrangement is such that a suitable rise in voltage across capacitor 522 switches the trigger circuit to an "off" condition whereas a fall in the voltage across capacitor 515 tends to switch the trigger circuit to an "on" condition. Consequently, pulses of current flow through element 521. The voltages developed across capacitors 515 and 522 are either equal or in constant proportion to each other and the proportionality between error signal and mean power supplied to the element 521 is maintained. This controller therefore provides a proportional action.

It is to be observed at this point that, whereas in the controller of FIG. 12 the output of the feedback circuit is applied to the input of the amplifier, in the controller of FIG. 13 the output of the feedback circuit is applied to the input of the trigger circuit.

The diode 525 has the effect of improving performance when the period during which element 521 is energized is small compared with the cycling time.

The motor of which element 521 is the electrical circuit element is operatively connected to a correcting element influencing the temperature of a medium to which detector element 501 is exposed. This influence which energization of element 521 has upon the detector element 501 is indicated schematically in FIG. 13 by a chain-dotted line linking element 501 and 521.

FIG. 14 shows a modification of part of the circuit of FIG. 13, the modification consisting in substituting a thermal delay means for the resistance-capacitance delay means of FIG. 13 without changing the simple proportional action of the controller.

The measuring element of FIG. 14 comprises a bridge circuit having a detector element 501 connected in one arm, a fixed resistor 529 and a first temperature sensitive element 530 connected in series in a second arm diametrically opposed to the one arm and a fixed resistor 531 and a second temperature sensitive element 523 connected in series in a third arm. Preferably, in order to compensate for changes in ambient temperature resistors 529 and 531 have the same values and resistors 530 and 532 have the same values when they are at the same temperature.

The output circuit of FIG. 14 is similar to that of FIG. 13 but its output is connected to load element 521 and a parallel circuit comprising heater 533 and adjustable resistor 534 connected in series. Temperature sensitive element 530 is exposed to heat generated by energization of a heater 533. The connections between heater 533 and resistor 534 are not shown but they interconnect points *x* and *x* and points *y* and *y* respectively.

The arrangement is such that cooling of detector element 501 causes the silicon-controlled rectifier 520 to fire and when that happens heater 533 is energized and the temperature of temperature sensitive resistor 530 increases until the silicon-controlled rectifier 520 ceases to conduct.

The proportional band of the controller of FIG. 14 may be varied either by adjustment of the variable resistor 534 or by varying the resistances of resistors 529 and 531 equally.

FIG. 15 shows a modification of part of the circuit of FIG. 13, the modification consisting in adding a second feedback circuit for the purpose of causing the controller to have an integral action in addition to the proportional action of the controller of FIG. 13.

The measuring element of FIG. 15 comprises a bridge circuit having a detector element 501 connected in one arm, a resistor 529 and a temperature sensitive resistor 530 connected in series in a second arm and a resistor 529*a* and a temperature sensitive resistor 530*a* connected in series in a third arm. Preferably, in order to compensate for changes in ambient temperature, the resistors 529 and 529*a* are equal and the temperature sensitive resistors 530 and 530*a* are equal at the same temperature.

The second arm of the bridge is adjacent to the one arm and temperature sensitive resistor 530*a*, which is connected in the second arm, is exposed to heat generated when heater 533 is energized.

Load element 521 is connected in series with a parallel circuit comprising the heater 533 and a variable resistor 534 connected in parallel by leads (not shown) interconnecting the points *x*, *x* and *y*, *y* respectively. Heater 533 is therefore energized when the silicon-controlled rectifier 520 fires and the effect of such heating is to change the balance condition of the bridge so that there is added to the error signal a component approximately representing the time integral of the error signal. The magnitude of this component may be varied by adjustment of variable resistor 534 or by varying resistors 529 and 529*a*.

FIG. 16 shows a modification of part of the circuit of FIG. 15, the modification consisting in providing a different measuring element in order to give the controller a differential action in addition to the proportional action of the controller of FIG. 15.

The measuring element of FIG. 16 comprises a bridge circuit having a detecting element 501 connected in one arm, resistor 529 and temperature sensitive resistor 530 connected in series in a second arm opposed to the first arm and resistor 529*a* and temperature sensitive resistor 530*a* connected in series in a third arm. In order to compensate for changes in ambient temperature the second arm also includes a series connected temperature sensitive resistor 530*b* having the same resistance as temperature sensitive resistor 530*a* when they are at the same temperature and the third arm also includes a series-connected temperature sensitive resistor 530*c* having the same resistance as temperature sensitive resistor 530 when they are at the same temperature. Temperature sensitive resistors 530 and 530*a* are exposed to the heat generated when heaters 533 and 533*a* respectively are energized. Heaters 533 and 533*a* are connected in series between points *x* and *y* which are respectively connected to the points *x* and *y* in the output circuit of FIG. 15.

The arrangement is such that the resistances of elements 530 and 530*a* change equally in opposite directions when heaters 533 and 533*a* are energized by a steady current for a period sufficiently long to allow elements 530 and 530*a* to reach a steady temperature but the time constants of the two elements 530 and 530*a* are different, element 530*a* being arranged to give a positive feedback with a short time constant and element 530 being arranged to give a negative feedback with a long time constant. The combined effect of the characteristics of the two elements 530 and 530*a* is thus to give the controller an approximately derivative effect in addition to the proportional effect due to the feedback circuit of FIG. 15.

The magnitude of this derivative effect may be adjusted by varying the resistance of variable resistor 534 of FIG. 15.

The thermal feedback of FIG. 14 may be combined with the mechanical feedback of FIG. 12*a* as shown in FIG. 17 wherein the load element 521 is a heater of a thermal motor 521*a*, of the kind referred to above, having an actuator 405*a* operatively connected to a valve 410 and a slider 409*a*.

The measuring element is a bridge circuit having a detector element 501 in one arm. The balance condition of the bridge circuit is varied by movement of slider 409*a* over a resistor 409 as described above with reference to FIG. 12*a*. The bridge circuit also includes a temperature sensitive resistor 530 connected in a second arm opposed to the one arm and exposed to heat generated by energization of heater 533. The heater 533 is connected in series with the load element 521 and rectifier 527.

The operation of the thermal feedback and of the mechanical feedback are described above with respect to FIGS. 14 and 12*a* respectively.

The circuit of a further embodiment of the theoretical circuit of FIG. 11 is shown in FIG. 18. In this embodiments two feedback signals are fed to the input of the amplifier. As the circuit of FIG. 18 is generally similar in part to that described above with reference to FIG. 17 and in part to that of FIG. 13 it will be described only briefly.

The measuring element comprises a bridge circuit having a detector element 501 connected in one arm and a resistor 409 and a cooperating slider 409*a* similar to corresponding elements of FIG. 17. The bridge circuit is supplied with direct current and the slider is operatively connected to an actuator 405*a* of a thermal motor and its output is connected to an amplifier.

The amplifier comprises a transistor 535 and associated circuit elements connected as a chopper followed firstly by two transistors 536 and 537 and associated circuit elements connected as a two stage alternating current amplifier and secondly by a discriminator similar to that of FIG. 13.

The discriminator is connected to a trigger circuit similar to that of FIG. 13 and comprising transistors 517, 518 and associated circuit elements.

The output circuit is generally similar to that of FIG. 13.

A first feedback circuit comprises a capacitor 538 and a resistor 539 connected in series across the heater element 521 of a thermal motor 521*a*. The capacitor 538 thus charges and discharges according as the heater 521 is energized or deenergized and a feedback signal proportional to the voltage across capacitor 538 is fed to the input to the amplifier through resistor 540. This feedback circuit therefore causes the controller to have a corresponding proportional action.

A second feedback circuit comprises the resistor 409 and slider 409*a*. The arrangement is such that movement of the actuator 405*a* produces a signal at the output of the measuring element which is in opposition and proportional to the error signal causing such movement. This feedback circuit therefore also causes the controller to have a corresponding proportional action.

The silicon controlled rectifier 402 or 520 may be replaced by any other suitable switching device, for example a reed switch 541 having its contacts connected in series with the load element 521 and its energizing coil 541*a* connected to the output of the amplifier as shown in FIG. 19.

In the various position feedback arrangements described above instead of the actuator 405*a* being operatively connected to a slider 409*a* arranged for making adjustable connection with a resistor 409 connected in the bridge circuit forming the measuring means, the actuator may, as indicated in FIG. 21, be operatively connected to a variable mutual inductance device. An alternative form of position feedback is shown in FIG. 20. In this alternative arrangement a measuring element in the form of a bridge circuit having a detecting element 501 connected in one arm also has a temperature sensitive element 530 connected in a second arm diametrically opposed to the one arm and exposed to the temperature of the body of a thermal motor 521*a*. When the body of the motor is heated by energization of the motor heater 521 the motor actuator 405*a* moves in accordance with the mean temperature of the body. As the resistance of the temperature sensitive resistor 530 varies in accordance with the mean temperature the balance condition of the bridge is changed in accordance with the position of the actuator 405*a*.

The various thermal feedback circuits described above for giving the controller a proportional action may be replaced by the circuit arrangement shown in FIG. 22, in which a heater 533 is arranged for heating a temperature sensitive detecting element 501 connected in one arm of the bridge circuit of the measuring element and the heater 533 is connected in parallel with the heater 521 of the motor. As the heating of the detecting element 501 is proportional to the mean power supplied to the thermal motor this arrangement also gives the controller a proportional action.

More than one of the above described feedback circuits may be provided in a single controller. Thus the controller described above with respect to FIG. 12*a* comprises a first feedback means including a resistance-capacitance network for causing the controller to have a proportional or a proportional plus integral effect and a second feedback means including a mechanical link for causing the controller to have an additional proportional effect. Similarily the controller described above with respect to FIG. 15 comprises a first feedback circuit including a resistance-capacitance network for the purpose of causing the controller to have a proportional action and a second feedback circuit including a thermal element for the purpose of causing the controller to have an integral action also. Similarly, the controller described above with respect to FIG. 16 comprises a first feedback circuit including a resistance-capacitance network for the purpose of causing the controller to have a proportional action and a second feedback circuit including a thermal element for the purpose of causing the controller to have a derivative action also. Similarly, the controller described above with respect to FIG. 17 comprises a first feedback means including a thermal element for the purpose of causing the controller to have a proportional action and a second feedback means including a mechanical link for the purpose of causing the controller to have an additional proportional effect. Similarily, the controller described above with respect to FIG. 18 comprises a first feedback circuit including a resistance-capacitance network for the purpose of causing the controller to have a proportional effect and a second feedback circuit including a mechanical link for causing the controller to have an additional proportional effect.

FIG. 23 is a circuit diagram of a further embodiment of the invention. In this embodiment the measuring element comprises a bridge circuit having a detector element 501 connected in one arm. The input of the bridge circuit is connected between terminals L and E and it is intended that those terminals should be connected to a source of alternating current. The detector element 501 is exposed to heat generated when heater 533 is energized and the means for energizing heater 533 is described below.

The output signal of the bridge circuit is applied to an input transformer 512 of an amplifier having a single amplifier stage comprising a transistor 542 and associated circuit elements connected in known manner and arranged for energization from terminals L and E through a diode 544.

The amplifier output signal is applied to a combined trigger element and output circuit comprising a transistor 543 having a coil 541*a* of a reed relay 541 and a diode 545 connected in series in its collector circuit. A capacitor 546 is connected in parallel with the coil 541*a*. The arrangement is such that current flows through the coil 541*a* only when the phase of a single generated by the bridge circuit is the same as that of the voltage applied to the collector of transistor 543. Due to the snap-action characteristic of the reed relay 541 the contacts of the relay can be arranged to close and open at predetermined values of signal generated by the bridge circuit. The reed relay thus operates as a trigger element.

The contacts of the relay 541 are connected in series with a heater 521 of a thermal motor between terminals L and E. Heater 533 is connected in parallel with heater 521 by means of leads (not shown) interconnecting the points $x$, $x$ and $y$, $y$ respectively.

The thermal feedback circuit including heater 533 gives the controller a proportional action as described above with reference to FIG. 22.

The arrangement of FIG. 23 also includes a second feedback circuit whereby the balance condition of the bridge circuit is varied in accordance with position of the actuator 405*a* of the thermal motor. This feedback circuit comprises a slider 409*a* movable over a resistor 409 for making adjustable connection thereto, the slider 409*a* being operatively connected to the actuator 405*a* and the resistor 409 being connected in the bridge circuit so that slide 409*a* forms one output terminal thereof.

This second feedback circuit may be eliminated and the resulting controller will be satisfactory for many applications. The provision of a second (position) feedback is however attended by certain advantages which are discussed in detail below.

FIG. 24 is a circuit diagram of a further embodiment of the invention which differs from the embodiments of FIG. 18 in that the trigger element and output circuit of FIG. 18 are replaced by a combined trigger and output circuit comprising a reed relay 541. Like the embodiment of FIG. 18, the embodiment of FIG. 24 comprises a first feedback circuit comprising a resistance-capacitance network and a second feedback circuit comprising means for adjusting the balance condition of the bridge network of the measuring unit in accordance with the position of the actuator 405 of the thermal motor 521*a*, each circuit causing the controller to have a corresponding proportional action.

In each of the arrangements described above with respect to FIGS. 16, 17, 18, 23 and 24 two separate feedback circuits are provided each of which causes the controller to have a corresponding proportional action. Such arrangements have two important advantages, as follows:

a. the time lag between a change in the error signal and movement of the actuator to a position corresponding to the changed error signal is greatly reduced; and, b. accuracy of control is improved.

A proportional action produced by a feedback circuit of the kind described above comprising a resistance-capacitance network or a thermal element results in the motor, assumed to be of a thermal or like type as defined above, taking up its final position following a change in the error signal after a period determined by the time constant of the movement of the motor. This period may be so long as to be unacceptable for certain applications.

A position feedback avoids this difficulty over a certain range but the cycling time becomes dependent upon the characteristics of a plant being controlled when the motor approaches its final position following a change in the error signal, and may be so long that the motor is energized for such long periods that is oscillates between two widely separated positions and this is, of course, unacceptable.

By using a position feedback in addition to a resistance-capacitance or thermal feedback the cycling time can be limited so as not to become unduly high as the motor approaches a final position.

When an electric thermal motor is used to actuate a correcting element in the form of a valve the motor is usually mounted upon the housing of the valve. When the valve is used to control the flow of a hot fluid it is advantageous to arrange that the energization of the heater of the motor causes the valve to close because an exchange of heat between the valve housing and the motor then occurs and this exchange of heat improves the stability of operation of the valve.

When, for example, the motor heater is deenergized the valve opens and allows more hot fluid to flow, with the result that the temperature of the valve housing rises. The motor is then subject to a cooling effect due to the heater being deenergized and to a heating effect due to the increased temperature of the housing causing more heat to be conducted from the housing to the motor. When, on the other hand, the motor heater is energized, the valve closes and the motor is then subject to a heating effect due to the heater being energized and to a cooling effect due to a reduction in the conduction of heat from the valve. The effect of this conduction is thus to provide some degree of negative feedback which improves the stability of operation of the valve.

A preferred form of such a motor and valve assembly is shown in FIG. 25. In this form of assembly a thermal motor comprises a heater 601 wound upon, but insulated from, a hollow cylinder 602 formed of thermally conducting material such as brass. The cylinder 602 is closed at its upper end and an actuator rod 603 projects through a sealed aperture in the lower end of the cylinder 602. The space between the internal walls of the cylinder 602 and the actuator rod 603 is filled with a material, for example a wax, having a high coefficient of thermal expansion over at least a part of the temperature range over which it is chemically stable.

The cylinder 602 is mounted upon a flange 604 which is, in turn, rigidly supported upon upper ends of supports 605 the lower ends of which are rigidly supported by the housing 606 of a valve 607.

The valve comprises a valve closure member 608 and a valve seat 615. The valve closure member 608 is rigidly attached to the lower end of a shaft 609 which passes through a sealed aperture in the wall of the housing 606 and is axially aligned with the actuator rod 603.

Rigidly attached to the lower end of the actuator rod 603 is a member 610 having a flange 611 disposed transversely to the axis of the actuator rod 603 and a hollow cylindrical member 612 axially aligned with the actuator rod 603. A helical spring 613 is compressed between the flange 611 and the valve housing 606 and acts to resist downward movement of the actuator rod when the expansible material in cylinder 602 expands due to heater 601 being energized and to impart an upward movement to the actuator rod when the material in cylinder 602 contracts due to heater 601 being deenergized.

The downward movement of the actuator rod 603 is transmitted to the shaft 609 by a second helical spring 614 which is compressed between opposed faces of the member 610 and the shaft 619. The spring 614 also serves to prevent the valve closure member being damaged as it is capable of absorbing downward movement of the actuator in excess of that required to cause the valve closure member 608 to engage the valve seat 615.

The upward movement of the actuator rod 603 is transmitted to the shaft 609 by engagement of an inwardly turned lip 616 formed on the lower end of the cylindrical member 612 engaging the lower face of an annular flange 617 formed on the upper end of shaft 619.

FIG. 26 shows a different form of motor and valve assembly which does not possess the negative thermal feedback feature referred to above with respect to FIG. 25.

The operation of this assembly may briefly be described as follows:

When heater 701 is energized a wax-filled cylinder 702 is heated, causing the wax to expand and force an actuator rod 703 downwards relatively to the cylinder 702. Downward movement of the actuator rod relatively to the valve body 704 is however prevented by a pin 705 which is rigidly attached to and disposed transversely to the lower end of the actuator rod 703 and abuts an upper face of a valve body 704. Energization of heater 701 therefore causes cylinder 702 to move upwards and to lift a bridge piece 706 against a downward pull due to spring 707. This upward movement of the cylinder 702 is transmitted to a shaft 708 due to the pin 705 abutting the upper end of a slot 709 in the shaft 708. A valve closure member 710 is rigidly attached to the lower end of the shaft 708 and this valve closure member 710 is therefore lifted from a valve seat 711 when the heater 701 is energized.

When heater 701 becomes deenergized the wax cools and contracts, the cylinder 702 and bridge piece 706 are pulled downwards by the springs 707 and this downward movement is transmitted to the shaft 708 when this movement has progressed sufficiently for the pin 705 to engage the lower end of the slot 709. Continued downward movement of the cylinder 702 and the bridge piece 706 causes the valve closure member 710 to engage valve seat 711.

In the arrangement of FIG. 11 any other suitable measuring element may be used for generating an electrical signal in accordance with a physical quantity, for example the position of a movable member relative to a datum position.

Corresponding modifications can be made in the embodiments described above with respect to FIGS. 12 to 24.

Preferably the cycling time of the controller is between 50 percent and 2 percent of the time constant of the movement of the motor actuator because, if the cycling time is above the higher value the motor actuator oscillates with an unduly high amplitude and if the cycling time is below the lower value the actuator takes a unduly long time to reach its final position after a change in the error signal unless two proportional feedback circuits are provided as described above. The lower figure can be much smaller than 2 percent if the controller is provided with a position feedback.

Preferably also, the controller is so arranged that the cycling time is short enough to cause the actuator to oscillate at a frequency which is high enough to prevent substantial oscillation of the physical value in the plant being controlled. By doing this friction between moving parts is overcome and the mean position of the actuator is closer to the theoretically desired value that it would be if no oscillation of the actuator occurs.

It will be apparent that the thrust exerted by the actuator decreases as the actuator approaches a final position corresponding to the error signal and it follows that, if no such oscillation of the actuator occurs, the thrust falls to a value equal to the friction before the theoretical final value is reached, and the actuator comes to rest before it reaches the theoretical final position. If a thermal motor is used this undesirable error is increased by the slight compressibility of the wax or other material in the motor.

The improvement in accuracy which is attained by arranging that such oscillation of the actuator occurs in such that for some applications the provision of a position feedback in addition to another proportional feedback becomes unnecessary.

I claim:

1. An electrical process control system for maintaining the magnitude of a physical parameter at a desired value comprising: measuring means for producing a first signal in accordance with said magnitude; two state switch means having an input and an output, said first signal being applied to said input, a thermal actuator which controls said magnitude and has a relatively slow response, said actuator comprising a container, a material which is disposed within the container and whose volume is dependent on its temperature; an electric heater operatively associated with the material; an output member which is partially disposed within the container and is moved outwardly upon expansion of said material; and a spring which acts on said output member and opposes its outward movement; signal-generating means for producing a second signal; connecting means which connect said signal generating means to said input and which include delay means, said actuator and said signal-generating means being operated by said switch means, said second signal being in the sense to cause said switch means to switch from the state in which it is in so that the said switch means cycles continuously between its two states; and feedback means operatively connected to said measuring means and which, when said output member of said actuator is moved in the direction to cause a change in said magnitude in one sense, changes said first signal in the sense corresponding to a change of said magnitude in the other sense.

2. A system as claimed in claim 1, wherein said delay means comprise a resistance-capacitance network.

3. A system as claimed in claim 1, which comprises amplifying means connected to said input and through which said first signal is applied to said input.

4. A system as claimed in claim 3, wherein said second signal is applied to said input through said amplifying means.

5. A system as claimed in claim 1, wherein said feedback means includes means for generating a signal in dependence on the position of said output member of said actuator.

6. A system as claimed in claim 1, wherein said feedback means includes means for changing said first signal in a manner to produce proportional plus integral action.

7. A system as claimed in claim 1, wherein said feedback means includes means for changing said first signal in a manner to produce proportional plus integral plus derivative action.

8. A system as claimed in claim 1, wherein said switch means comprises a trigger circuit.

9. An electronic controller comprising: sensing means responsive to a physical parameter and which produce a signal in accordance with the magnitude of said physical parameter; amplifying means, said signal being applied to said amplifying means; switch means having an input and an output, said amplifying means being connected to said input; a regulator for said parameter, said regulator being connected to said output and having a slow response; delay means through which said output is connected to said input; and feedback means connected to said sensing means for modifying said signal in response to the position of the regulator.